United States Patent
Ortiz et al.

(10) Patent No.: US 12,145,461 B2
(45) Date of Patent: Nov. 19, 2024

(54) INDUCTIVE CHARGING STATION

(71) Applicant: EV CHARGING SOLUTIONS LLC, Albuquerque, NM (US)

(72) Inventors: Luis M. Ortiz, Albuquerque, NM (US); Kermit D. Lopez, Albuquerque, NM (US)

(73) Assignee: EV Charging Solutions, LLC, Albuquerque, NM (US)

( * ) Notice: Subject to any disclaimer, the term of this patent is extended or adjusted under 35 U.S.C. 154(b) by 85 days.

(21) Appl. No.: 18/093,328

(22) Filed: Jan. 5, 2023

(65) Prior Publication Data
US 2023/0264584 A1 Aug. 24, 2023

Related U.S. Application Data

(60) Provisional application No. 63/297,215, filed on Jan. 6, 2022.

(51) Int. Cl.
*B60L 53/38* (2019.01)
*B60L 53/12* (2019.01)
*B60L 53/37* (2019.01)
*H02J 50/10* (2016.01)
*H02J 50/90* (2016.01)

(52) U.S. Cl.
CPC .............. *B60L 53/38* (2019.02); *B60L 53/12* (2019.02); *B60L 53/37* (2019.02); *H02J 50/10* (2016.02); *H02J 50/90* (2016.02)

(58) Field of Classification Search
CPC .......... B60L 53/38; B60L 53/12; B60L 53/37; H02J 50/10; H02J 50/90
See application file for complete search history.

(56) References Cited

U.S. PATENT DOCUMENTS

| | | | |
|---|---|---|---|
| 8,035,255 B2 | 10/2011 | Kurs et al. | |
| 8,736,226 B2 | 5/2014 | Mukai et al. | |
| 8,887,893 B2 | 11/2014 | Tsutsumi et al. | |
| 8,907,629 B2 | 12/2014 | Kelty et al. | |
| 8,933,661 B2 | 1/2015 | Nergaard et al. | |

(Continued)

FOREIGN PATENT DOCUMENTS

| | | |
|---|---|---|
| EP | 3 309 928 B1 | 5/2023 |
| EP | 3 631 819 B1 | 10/2023 |

(Continued)

OTHER PUBLICATIONS

International Application No. PCT/US2022/054188, PCT International Search Report, May 10, 2023.

(Continued)

*Primary Examiner* — Daniel Cavallari
(74) *Attorney, Agent, or Firm* — Ortiz & Lopez, PLLC; Kermit D. Lopez; Luis M. Ortiz

(57) ABSTRACT

In an embodiment, an apparatus for charging an electric vehicle, can include a receptacle mountable to a structure above the electric vehicle. The receptacle can maintain a charge transmitting device, which can be automatically moveable and directable from the receptacle toward a target area on the electric vehicle associated with a receiving coil mounted on the electric vehicle for the charging of an electric vehicle when the one receiving coil engages with the charge transmitting device when the electric vehicle is located below the receptacle. One or more optical sensors can be utilized to direct the charge transmitting device toward the target.

12 Claims, 10 Drawing Sheets

(56) References Cited

U.S. PATENT DOCUMENTS

| | | | |
|---|---|---|---|
| 8,973,768 | B1 | 3/2015 | Jung et al. |
| 9,120,641 | B2 | 9/2015 | Iida et al. |
| 9,381,878 | B2 | 7/2016 | Ichikawa |
| 9,566,872 | B2 | 2/2017 | Eger et al. |
| 9,637,014 | B2 | 5/2017 | Schneider et al. |
| 9,944,190 | B2 | 4/2018 | Lewis |
| 10,065,519 | B1 | 9/2018 | Applebaum |
| 10,135,496 | B2 | 11/2018 | Long et al. |
| 10,193,400 | B2 | 1/2019 | Long et al. |
| 10,348,136 | B2 | 7/2019 | John |
| 10,513,189 | B2 | 12/2019 | Takehara et al. |
| 10,604,020 | B2 | 3/2020 | Ricci |
| 10,834,174 | B2 | 11/2020 | Doumet |
| 10,857,897 | B2 | 12/2020 | Narla |
| 10,946,753 | B2 | 3/2021 | Cho |
| 10,953,767 | B2 | 3/2021 | Loghavi et al. |
| 11,142,087 | B1 | 10/2021 | Ogram |
| 11,161,426 | B2 | 11/2021 | Park et al. |
| 11,214,163 | B2 | 1/2022 | Moghe et al. |
| 11,479,132 | B2 | 10/2022 | Kurs et al. |
| 11,565,594 | B2 | 1/2023 | Harmon et al. |
| 11,581,755 | B2 | 2/2023 | Schrafel et al. |
| 11,621,586 | B2 | 4/2023 | Masquelier et al. |
| 11,671,145 | B2 | 6/2023 | Daga et al. |
| 11,817,722 | B2 | 11/2023 | Wolgemuth et al. |
| 2010/0102775 | A1 | 4/2010 | Chander et al. |
| 2011/0031047 | A1 | 2/2011 | Tarr |
| 2014/0354229 | A1* | 12/2014 | Zhao ............ B60L 53/68 320/109 |
| 2017/0050529 | A1 | 2/2017 | Lambert et al. |
| 2017/0158072 | A1 | 6/2017 | Sychov |
| 2017/0274787 | A1 | 9/2017 | Salter et al. |
| 2019/0087446 | A1 | 3/2019 | Sharma et al. |
| 2019/0168623 | A1 | 6/2019 | Morris et al. |
| 2019/0184841 | A1 | 6/2019 | Van Wiemeersch et al. |
| 2020/0094700 | A1 | 3/2020 | Hui |
| 2020/0325717 | A1 | 10/2020 | Didio |
| 2020/0354000 | A1 | 11/2020 | Gammack |
| 2020/0391595 | A1 | 12/2020 | Sarkar et al. |
| 2021/0050127 | A1 | 2/2021 | Lee et al. |
| 2021/0061113 | A1 | 3/2021 | Ellis et al. |
| 2021/0074968 | A1 | 3/2021 | Herron et al. |
| 2021/0078433 | A1 | 3/2021 | Cha |
| 2021/0091352 | A1 | 3/2021 | Weicker et al. |
| 2021/0094430 | A1 | 4/2021 | Shin et al. |
| 2021/0094626 | A1 | 4/2021 | Kimura et al. |
| 2021/0099097 | A1 | 4/2021 | Zhang |
| 2021/0291692 | A1 | 9/2021 | Masoud et al. |
| 2021/0328443 | A1 | 10/2021 | Wolgemuth |
| 2021/0328626 | A1 | 10/2021 | Daga et al. |
| 2023/0105687 | A1 | 4/2023 | Wolgemuth et al. |
| 2023/0166608 | A1 | 6/2023 | MacKenzie et al. |
| 2023/0166627 | A1 | 6/2023 | Vogt et al. |
| 2023/0173902 | A1 | 6/2023 | Ruiz et al. |
| 2023/0249559 | A1 | 8/2023 | Schrafel et al. |

FOREIGN PATENT DOCUMENTS

| | | |
|---|---|---|
| WO | 2013050447 A2 | 4/2013 |
| WO | 2015112381 A1 | 7/2015 |
| WO | 2020013989 A1 | 1/2020 |

OTHER PUBLICATIONS

International Application No. PCT/US2022/054188, PCT Search History, Apr. 18, 2023.

Ed Ludlow, "Rivian adopts Tesla's EV charging standard, joining Ford and GM", Bloomberg News, Jun. 20, 2023.

Matt Minner, "4 Types of Robots Every Manufacturer Should Know", NIST, Manufacturing Innovation Blog, Jul. 11, 2019, https://www.nist.gov/blogs/manufacturing-innovation-blog/4-types-robots-every-manufacturer-should-know.

"Plug-In Electric Vehicle Handbook for Public Charging Station Hosts", U.S. Department of Energy, Apr. 2012.

Pless, Shanti, Amy Allen, Lissa Myers, David Goldwasser, Andrew Meintz, Ben Polly, and Stephen Frank. 2020. Integrating Electric Vehicle Charging Infrastructure into Commercial Buildings and Mixed-Use Communities: Design, Modeling, and Control Optimization Opportunities; Preprint. Golden, CO: National Renewable Energy Laboratory. NREL/CP-5500-77438. https://www.nrel.gov/docs/fy20osti/77438.pdf.

A. Haidar & K. M.. MuDaqi , "Behavioral characterization of electric vehicle charging loads in a distribution power grid through modeling of batter chargers," in 2014 Industry Applications Society Annual Meeting (IACC 2014), 2014, pp. 1-8.

Sri Vijay Vangapandu, "Bidirectional Wireless EV Charging and Smart Grid Integration", EE Power, Mar. 1, 2021.

Simon Heckford, "Design of an onboard battery battery charger for an electric vehicle," Department of Industrial Electrical Engineering and Automation, Lund University, 2000.

"EV Bi-directional charging—Everything you need to know", Home Charging Stations, homechargingstations.com.

"Electric Vehicle Charging Infrastructure", RMI India, May 2020.

"Costs Associated With Non-Residential Electric Vehicle Supply Equipment Factors to consider in the implementation of electric vehicle charging stations", Prepared by New West Technologies, LLC for the U.S. Department of Energy Vehicle Technologies Office, Nov. 2015.

"Interoperability of Public Electric Vehicle Charging Infrastructure", Electric Power Research Institute, Aug. 2019.

Anjana Wijesekera, and Prabath Binduhewa, "Impact of Electric Motorcycles on Distribution Network and Design of a Charger for Electric Motorcycles", IEEE, 2018.

"Inductive Charging", Wikipedia, https://en.wikipedia.org/wiki/Inductive_charging, page last edited on Dec. 4, 2021.

Ezhil Reena Joy.T.P, Kannan Thirugnanam and Praveen Kumar, "A New Concept for Bidirectional Inductively Coupled Battery Charging System based on AC-DC-AC Converter for PHEV's and EV's using Fuzzy Logic Approach", Conference Paper, IEEE, 2012.

Muhammad Asri Zainal Abidin, Wan Ismail Ibrahim and Mohd Shawal Jadin, "Design of Inductive Power Transfer (IPT) for Low-Power Application", ARPN Journal of Engineering and Applied Sciences, vol. 10, No. 21, Nov. 2015.

Nameer Ahmed Khan, "Wireless Charger for Electric Vehicles with Electromagnetic Coil Based Position Correction", 2019, University of Toronto, Graduate Department of Electrical and Computer Engineering.

"ORNL demonstrates 120-kilowatt wireless charging for vehicles", Oak Ridge National Laboratory, Oct. 19, 2018.

Saeid Haghbin, "An Isolated Integrated Charger for Electric or Plug-in Hybrid Vehicles," Thesis, Division of Electric Power Engineering Department of Energy and Environment, Chalmers University of Technology, Goteborg, Sweden, 2011.

Ali Saadon Al-ogaili, et al., "Design of Three Levels Electric Vehicle Charger Integrated PV System", Test Engineering and Management, Nov.-Dec. 2019, ISSN: 0193-4120 p. 5671-5679.

Omer C. Onar and P.T. Jones, "Wireless Charging of Electric Vehicles", Oak Ridge National Laboratory, U.S. Doe Vehicle Technologies Office, 2015 Annual Merit Review and Peer Evaluation Meeting, Jun. 10, 2015.

Chun Qiu, et al., "Overview of Wireless Charging Technologies for Electric Vehicles", Journal of Asian Electric Vehicles, vol. 12, No. 1, Jun. 2014.

"SAE International Publishes Two New Documents Enabling Commercialization of Wireless Charging for Electric Vehicles", Oct. 22, 2022, https://www.sae.org/news/press-room/2020/10/sae-international-publishes-two-new-documents-enabling-commercialization-of-wireless-charging-for-electric-vehicles.

"Standards Commercialization & global interoperability," https://witricity.com/innovation/standards/, downloaded Apr. 6, 2023.

Ky Sealy, "Next Gen Charging: The Future Is Wireless", Mar. 31, 2023, EV Charging Summit, Las Vegas, NV, Mirage Casino.

"Meet Your EV Consumer", WiTricity 2022, https://witricity.com/wp-content/uploads/2022/12/WiTricity_Chargers_eBook_Volume_2.pdf.

(56) References Cited

OTHER PUBLICATIONS

Marie Rajon Bernard, Alexander Tankou, Hongyang Cui, and Pierre-Louis Ragon, "Charging Solutions for Battery-Electric Trucks", White Paper, International Council on Clean Transportation, Dec. 2022.

"Luxury EV Buyers Demand Latest Technology," WiTricity, 2023.

"ChargeArm, Supporting home EV charging," downloaded Feb. 16, 2024, https://chargearm.com/en/.

Stefan Berggren, "Future-proofing EV charging solutions with wireless connectivity," u-blox AG.

Mohini Gade, Sanchita Jadhav, Ganesh Kedar, Sahil Kedar, Vijay Kumar, "Wireless Charging Station and Battery Management Unit of Electric Vehicle," International Research Journal of Modernization in Engineering Technology and Science, vol. 04/Issue:05/May 2022, www.irjmets.com.

Chuck Byers, Ashok Moghe, John Apostolopoulos, "Gantry Robot for Charging Multiple Electric Vehicles," Technical Disclosure Commons, Defensive Publication Series, Jun. 7, 2019.

Chuck Byers, Ashok Moghe, John Apostolopoulos, "Ground Robot for Charging Multiple Electric Vehicles," Technical Disclosure Commons, Defensive Publication Series, Jun. 7, 2019.

Mohammad Ibrahim. Wireless Inductive Charging for Electrical Vehicules: Electromagnetic Modelling and Interoperability Analysis. Electric power. Université Paris Sud—Paris XI, 2014. English. NNT : 2014PA112369.tel-01127163.

Luke Hutchinson, Ben Waterson, Bani Anvari, Denis Naberezhnykh, "Potential of Wireless Power Transfer for Dynamic Charging of Electric Vehicles," IET Intell. Transp. Syst., 2019, vol. 13 Iss. 1, pp. 3-12, The Institution of Engineering and Technology, 2018.

"Inductev", 2021 Momentum Dynamics Corporation.

Leandros A. Maglaras, Jianmin Jiang, Athanasios Maglaras, Frangiskos V. Topalis, Sotiris Moschoyiannis, "Dynamic wireless charging of electric vehicles on the move with Mobile Energy Disseminators," (IJACSA) International Journal of Advanced Computer Science and Applications, vol. 6, No. 6, 2015.

Florian Nägele and Shivika Sahdev, "Perspectives on wireless and automated charging for electric vehicles," Apr. 3, 2023 | Interview, downloaded Feb. 16, 2024, https://www.mckinsey.com/industries/automotive-and-assembly/our-insi...erspectives-on-wireless-and-automated-charging-for-electric-vehicles.

Ahmed A. S. Mohamed, Ahmed A. Shaier, Hamid Metwally, and Sameh I. Selem, "Wireless charging technologies for electric vehicles: Inductive, capacitive, and magnetic gear," IET Power Electronics, Received: May 29, 2023, Revised: Sep. 6, 2023, Accepted: Nov. 18, 2023, IET Power Electron. 2023;1-27., wileyonlinelibrary.com/iet-pel.

S. Himmelstein, "Overhead system simplifies EV charging," Electronics360, Sep. 12, 2023, https://electronics360.globalspec.com/article/20001/overhead-system-simplifies-ev-charging.

Karl Eric Schrader, "Drive-Through Covered Charging Station for Battery-Powered Drive-Through Covered Charging Station for Battery-Powered Vehicles," Technical Disclosure Commons, Defensive Publications Series.

Riz Akhtar, "Tesla confirms it is working on new wireless EV charger," https://thedriven.io/2023/12/20/tesla-confirms-that-working-on-a-new-wireless-ev-charger/, Dec. 20, 2023.

* cited by examiner

INDUCTIVE CHARGING STATION

CROSS-REFERENCE TO PROVISIONAL APPLICATION

This patent application claims priority under 35 U.S.C. § 119(e) to U.S. Provisional Patent Application Ser. No. 63/297,215 entitled "Inductive Charging Station," which was filed on Jan. 6, 2022, the disclosure of which is incorporated herein by reference in its entirety.

TECHNICAL FIELD

Embodiments are related to electric vehicles and more particularly to the wireless charging of electric vehicles. Embodiments also relate to infrastructure for wireless charging of electric vehicles. Embodiments further relate to wireless inductive charging of electric vehicles.

BACKGROUND

Unlike gasoline and diesel vehicles, which can use a service station, electric vehicles need to be recharged either from special connectors installed at the residence, or at special charging stations found at designated locations. Finding these locations can be difficult and time consuming and with the limited range that an electric vehicle is handicapped with, long distance travel becomes complex if not impossible. The necessary infrastructure of charging stations is not adequately present, nor is the ease of use and implementation of charging systems in residences or in public and commercial settings.

Furthermore, the charging of the rechargeable battery within the electric vehicle takes much more time than the application of gasoline or diesel to an international combustion engine's fuel tank. Hence, the need by an owner of an electric vehicle to remember to charge the electric vehicle overnight at his or her residence. If the owner does not remember to plug in, then they will surely be late as they must wait to get an adequate charge the next day or will suffer from range anxiety because they are not sure they will make it to their destination without an adequate charge.

Current home charging typically involves the use of a Level 2 charger (e.g., a 240-volt source that typically can add 25 or more miles of driving range per hour) that an electric vehicle owner can control, and which can be available for use based on the household's schedules (e.g., overnight when electric rates are lower), thereby reserving public charging for short-term needs around town or for distance traveling. Home charging systems can be cumbersome and can take up space in, for example, a home carport or garage. Stations are typically wall or ground mounted and require the handling of cables to connect to and plug into electric vehicles. Furthermore, either the wall- or ground-mounted units and associated cables can be in the way of human movement around the electric vehicle or within a garage installment.

One solution for both home charging and public charging scenarios, involves inductive power transfer (IPT) systems for the wireless transfer of energy. IPT systems also referred to as electromagnetic power charging systems include a primary (or "base") power device (e.g., electromagnetic power transmitting device) that can transmit power to a secondary (or "pick-up") power receiver device (e.g., electromagnetic power receiving device). Each of the electromagnetic power transmitter and receiver devices can include inductors, typically coils or windings of electric current conveying media. An alternating current in the primary inductor (the electromagnetic power transmitting device) produces a fluctuating electromagnetic field. When the secondary inductor (electromagnetic power receiving device) is placed in proximity to the primary inductor (electromagnetic power transmitting device), the fluctuating electromagnetic field induces an electromotive force (EMF) in the secondary inductor, thereby transferring power to the electromagnetic power receiving device.

IPT systems for inductive charging of electric vehicle batteries typically require the use of ground-based (e.g., subsurface installation, or laying on top of the ground) wireless charging devices and/or charging coils implemented in a ground-based assembly also located beneath/underneath an electric vehicle. In these situations, an electric vehicle equipped with an under-carriage charging receiver is moved into place above the inground-based charging assembly to charge the electric vehicle through wireless inductive charging. One of the problems with this approach is that concrete or pavement in existing parking spaces needs to be modified to install a system. Furthermore, the system, whether inground installed or a pad lying on the ground, is susceptible to interference caused by water, debris, and wear because of its ground-based location and contact with objects moving on the ground/surface. Ground-based systems can also present trip points to pedestrians traversing over the ground, which can present legal liability to a premises with such an installation. Debris and wear could also cause interference with electromagnetic power receiving device installed underneath the electric vehicle. Finally, accurate placement of the vehicle over the charging infrastructure becomes necessary for electromagnetic charging beneath the electric vehicle to work properly/efficiently. If too much distance is place between the transmitter and receiver, the system will operate less efficiently.

What is needed are electromagnetic charging systems and methods thereof that do not need to be installed inground or on the ground and overcome the limitations of requiring user handling of cables in cable-based charging systems.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and Abstract as a whole.

It is, therefore, an aspect of the embodiments to provide for an improved electric vehicle charging system that is based on wireless electromagnet charge transfer and does not require installation within or upon a ground surface located beneath electric vehicles.

It is another aspect of the embodiments to provide for an improved electric vehicle charging system that is based on electromagnet charge transfer and is located as part of a robotic system locatable (e.g., installed, mounted, positioned) on infrastructure in a manner to wireless charge electric vehicles from overhead and upon the electric vehicle's surfaces.

It is a further aspect of the embodiments to provide for an improved electric vehicle charging system that is based on electromagnet charge transfer and which can be mounted above an electric vehicle (e.g., at the ceiling of a garage, carport, bay, or on/from a boom, etc.) and robotically manipulated to place an electromagnetic power transmitting coil near or into contact with an electromagnetic power receiving coil located near or at the upper surfaces (e.g., roof, hood, trunk, etc.) of the electric vehicle.

The aforementioned aspects and other objectives and advantages can now be achieved as described herein. In an embodiment, an apparatus for charging an electric vehicle, can include a receptacle (i.e., system housing) mountable to a structure (e.g., ceiling, carport, bay, beam, post, boom etc.) located above and/or near an electric vehicle, wherein the receptacle maintains an electromagnetic power transmitting device, which is automatically moveable and directable from the receptacle toward a target area on the electric vehicle associated with at least one electromagnetic power receiving device mounted on the electric vehicle for the charging of an electric vehicle when the at least one electromagnetic power receiving device engages with the electromagnetic power transmitting device when the electric vehicle is located below the receptacle.

In an embodiment, the electromagnetic power transmitting device can automatically engage with the at least one electromagnetic power receiving device to wireless charge an electric vehicle and automatically disengage from the at least one electromagnetic power receiving device and retracts to the receptacle after charging of the electric vehicle is complete.

In an embodiment, the target can comprise an optically recognizable target.

In an embodiment, the at least one receiving coil can be operable to receive an electrical current from the electromagnetic power transmitting device for charging of the electric vehicle to which the at least one electromagnetic power receiving device can be contacted/connected.

In an embodiment, the electromagnetic power transmitting device can include a charging plate that can magnetically engage with the at least one electromagnetic power receiving device.

In an embodiment, the at least one electromagnetic power receiving device can be mounted on or within exterior surfaces the electric vehicle.

In an embodiment, the at least one electromagnetic power receiving device can be mounted on a roof of the electric vehicle.

In an embodiment, the at least one electromagnetic power receiving device can be integrated with the roof of an electric vehicle.

In an embodiment, the electric vehicle can comprise a plurality of glass windows, wherein the at least one electromagnetic power receiving device can be integrated (i.e., in the form of a coil) with at least one glass window among the plurality of glass windows of the electric vehicle.

In an embodiment, the receptacle can comprise a garage door opener that can include a garage door opener mounted to the structure with the receptacle, the structure comprising, for example, a ceiling structure.

In an embodiment, the receptacle can comprise an EV charging system mounted to a carport or bay under which the electric vehicle can park for charging of the electric vehicle by the electromagnetic power transmitting device, wherein the structure may comprise a carport or bay currently found in residential and commercial settings.

In an embodiment, the structure can be mounted to a boom associated with at least one of a service vehicle or ground mounted charging station.

In an embodiment, the service vehicle can be an autonomous vehicle that is controlled robotically using lidar for guidance and carrying charging batteries and a boom outfitted with a charge transmitting coil.

In another embodiment, the structure can be a boom that is mounted onto a mobile platform and can provide charging services to electric vehicles parked throughout a parking complex such as a multiple vehicle parking garage.

In an embodiment, an apparatus for charging an electric vehicle, can include: at least one electromagnetic power receiving device operable to receive an electrical current from an electromagnetic power transmitting device for charging of an electric vehicle connected to the at least one electromagnetic power receiving device; and a charging coil sticker comprising a pressure-sensitive adhesive that adheres to the electric vehicle and serves as a electromagnetic power receiving device, the charging coil sticker incorporating the at least one electromagnetic charge receiving coil, the charging coil sticker connected electrically to electrical wires that electrically connect to at least one of the power management system, battery and plug-in wiring of the electric vehicle, wherein the charging coil sticker is operable to connect electrically to the electromagnetic power transmitting device for receiving electromagnetic energy and charging of the electric vehicle.

In an embodiment, the electromagnetic power transmitting device can be robotically manipulated, controlled and maintained by a receptacle mounted to a structure, wherein the charge transmitting device is moveable and directable from the receptacle to an electromagnetic power receiving device charging (e.g., coil sticker) of the electric vehicle when the electromagnetic power transmitting device comes into electrical contact with the electromagnetic power receiving device when the electric vehicle is located below the receptacle.

In an embodiment, the electromagnetic power transmitting device can include a charging plate that can magnetically engage with the electromagnetic power receiving device (e.g., charging coil sticker), which can include the at least one receiving coil.

In an embodiment, the charging coil sticker can include the at least one receiving coil and can be mounted on the electric vehicle.

In an embodiment, the charging coil sticker that includes at least one receiving coil can be mounted on a roof of the electric vehicle.

In an embodiment, the charging coil sticker that includes the at least one receiving coil can be adhered to a sunroof of the electric vehicle.

In an embodiment, the electric vehicle can comprise a plurality of glass windows, wherein the charging coil sticker that includes the at least one receiving coil can be adhered to at least one glass window among the plurality of glass windows of the electric vehicle.

In an embodiment, the receptacle can comprise a garage door opener that can be mounted to the structure with the receptacle, wherein the structure can comprise a ceiling in a garage, carport or bay.

In an embodiment, the receptacle can comprise a charger incorporated onto a ceiling associated with a carport or bay under which the electric vehicle can park for charging of the electric vehicle by the electromagnetic power transmitting device when the electromagnetic power transmitting device engages with the electromagnetic power receiving device.

In an embodiment, the structure can comprise a boom mounted onto an autonomous service vehicle.

In an embodiment, an electric vehicle can comprise at least one battery, an electric vehicle body comprising a top portion, and a charging coil incorporated into the electric vehicle body in the top portion, wherein the charging coil receives an electromagnetic charge from an electromagnetic charging device for wireless charging of the at least one battery.

In an embodiment, the top portion of the electric vehicle can comprise at least one of: a roof, a trunk, a hood, a hatchback (in the case of the electric vehicle comprising a hatchback vehicle), a truck bed (in the case of the electric vehicle comprising a truck), and so on.

In an embodiment, an apparatus for charging an electric vehicle, can include a receptacle mountable to a structure operable to deploy an electromagnetic power transmitting device above an electric vehicle, wherein the receptacle maintains the electromagnetic power transmitting device, which is electromechanically and/or pneumatically movable and directable from the receptacle toward a target area on the electric vehicle associated with at least one electromagnetic power receiving device mounted on a surface of the electric vehicle for charging the electric vehicle when the electromagnetic power transmitting device is placed near and/or in contact with at least one of the target area and the electromagnetic power receiving device.

In an embodiment, charging can occur bidirectionally so that the electric vehicle can act as a power supply for a premises associated with the electric vehicle charging system, wherein the at least one receiving coil can when needed be operable to transmit an electrical current from the electric vehicle's batteries to the electromagnetic power transmitting device associated with the charging station for providing electric power from the electric vehicle to a premises associated with (and electronically connected via the premises' electric service) the charging station.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Like reference numerals or reference symbols in the various drawings indicate like or similar elements.

DETAILED DESCRIPTION

Figure 1:
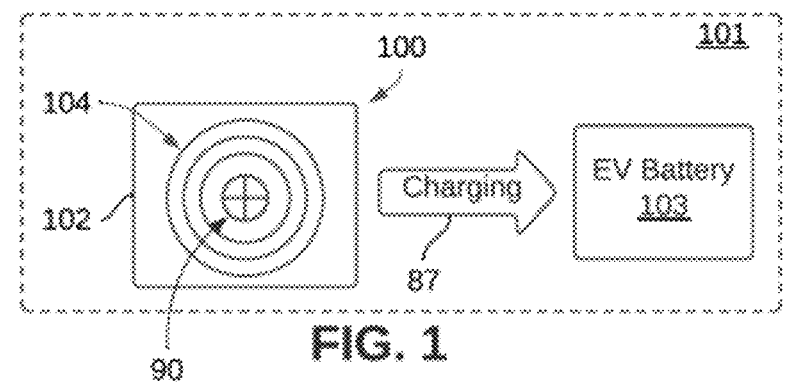
FIG. 1 illustrates a top view of an aspect of an electric vehicle charging system that includes an electromagnetic power transmitting device in the form of an electric vehicle charging pad apparatus comprising a charging pad and a charging coil integrated with or into the charging pad, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The term "data" as utilized herein can relate to physical signals that can indicate or include information. The term "data" can also relate to individual facts, statistics, or items of information, often numeric. In a more technical sense, data can be a set of values of qualitative or quantitative variables about one or more persons or objects, while a datum is a single value of a single variable. The term 'data' may also relate to the quantities, characters, and/or symbols on which operations can be performed by a computer, processor and/or application, with the data being stored and transmitted in the form of electrical signals and recorded on magnetic, optical, or mechanical recording media.

The terms "electric vehicle" and "EV" as utilized herein may be used interchangeably and can refer to an all-electric vehicle. Furthermore, the terms "battery", "cell", "battery cell", and "battery pack" may be used interchangeably and refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration.

FIG. 1 illustrates a top view of an electric vehicle charging system 101 that includes an electromagnetic power receiving device 100 comprising a charging pad 102 and a charging coil 104 integrated with or into the charging pad 102, in accordance with an embodiment. The charging pad 102 may be formed from a flexible but durable material such as rubber, a synthetic material, a polymer, an elastomer (e.g., thermoplastic elastomer), silicone, etc. The material that forms the charging pad 102 is preferably non-conducting and can also serve to insulate the charging coil 104 (i.e., receiving coil), which may be an induction coil.

The center of the charging coil 104 can include a target 90, which may be a marking such as, for example, a plus-shaped marking, or a marking of another shape (e.g., target, star symbol, hashtag, barcode, etc.). The target can also carry information identifying the electric vehicle (e.g., via hashtag or barcode). The target 90 can be configured as an optically recognizable target that can be recognized by one or more optical sensors (e.g., optical sensors 92 and 94 shown in FIG. 8 and FIG. 9). Sensor 92 and 94 can be provided in the form of video cameras. The usage of the target 90 will be explained in more detail later herein.

In an embodiment, an electromagnetic power receiving device in the form of a charging coil 104 can be a wireless reception coil that can operate by inductive charging (also referred to as wireless charging or cordless charging) for receiving a wireless power transfer of energy (and in some applications such as bidirectional power transfer, can provide the transfer of energy). The charging coil 104 can be an inductive coil that can thus use electromagnetic induction to receive electricity from an electromagnetic power transmitting device including a charge transmitting coil (not shown in FIG. 1). The charging coil 104 together with the charging pad 102 can form what can be referred to as an "inductive pad". The charging coil 104 can function as a reception coil that receives energy wirelessly from an electromagnetic power transmitting device through inductive charging. Note that an example of an electromagnetic power transmitting device is the charge transmitting coil 117 shown in FIG. 4 and FIG. 5. The charging coil 104 can thus wirelessly receive energy from a transmitting charging coil such as the charge transmitting coil 117.

Note that the term 'inductive charging' as utilized herein can relate to the wireless transfer of energy through inductive coupling. That is, in an inductive charging application, alternating current can pass through the charging coil 104 (e.g., induction coil) in the charging pad 102. The moving electric charge creates a magnetic field, which can fluctuate in strength because the current's amplitude is fluctuating. This changing magnetic field can create an alternate electric current in the charging coil 104, which in turn can pass through a rectifier (not shown in FIG. 1) to convert it to direct current. The direct current can charge an electric vehicle (EV) battery 103 or can provide operating power.

Charging of the EV battery 103 by the electromagnetic power receiving device 100 is indicated by arrow 87 in FIG. 1. The arrow 87 represents various circuits, electrical cabling and wires, and components (e.g., such as the aforementioned rectifier or rectifiers) that can facilitate charging of the EV battery 103 by the electromagnetic power receiving device 100 (also see charging system module 615 in FIG. 10).

In some embodiments, an electromagnetic power receiving device in the form of the charging pad 102 may be implemented as a 'sticker' that can adhere to an electric vehicle. That is, the charging pad 102 may be a charging coil sticker that can include a pressure-sensitive adhesive (e.g., on one side or both sides of the charging bad 102) that can adhere to the electric vehicle. The charging pad 102 can incorporate the charging coil 104 such that the charging coil sticker (i.e., the charging pad 102 including the charging coil 104) can be connected electrically to electrical wires that can electrically connect to one or more batteries (e.g., EV battery 103) of the electric vehicle. The charging pad 102 can be implemented in the form of a charging coil sticker that is operable to connect electrically to the electromagnetic power transmitting device 114 for electric charging (e.g., inductive charging) of the electric vehicle 112. In a 'sticker' embodiment, the charging pad 102 may be a thin material made of, for example, vinyl, paper, or another material, and may include one or more conductive layers that can form the charging coil 104. In some embodiments, the charging pad 102 (i.e., the charging coil sticker) may include one or more transparent conductive layers formed on a translucent or transparent substrate. The one or more transparent conductive layers may form the charging coil 104.

Figure 2:
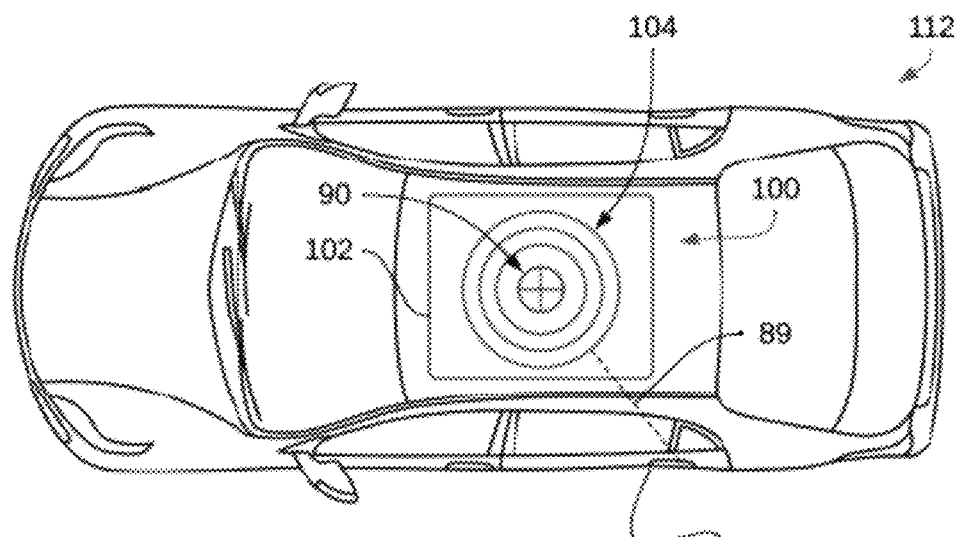
FIG. 2 illustrates a top view of an electric vehicle and the electric charging pad apparatus of FIG. 1 mounted on the electric vehicle, in accordance with an embodiment.
Figure 3:
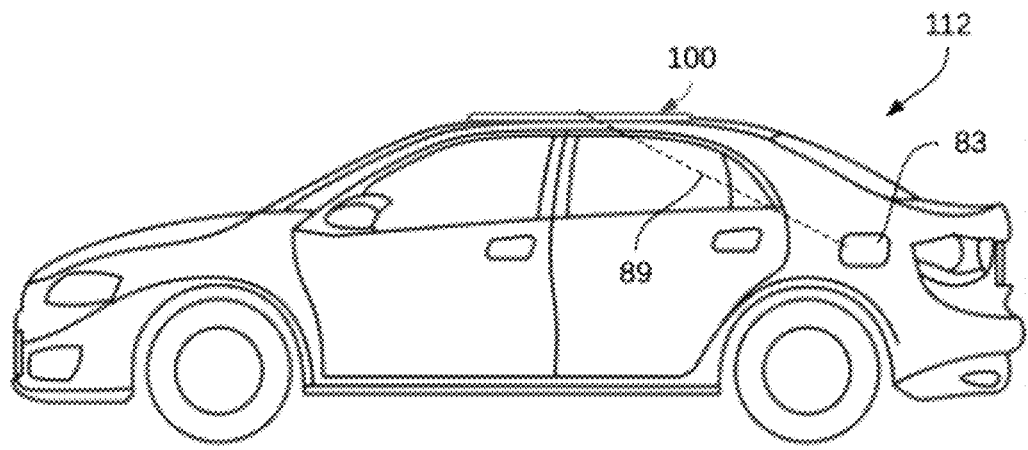
FIG. 3 illustrates a side view of the electric vehicle shown in FIG. 2 with the electric charging pad apparatus, in accordance with an embodiment.

FIG. 2 illustrates a top view of an electric vehicle 112 and the electromagnetic power receiving device 100 mounted on the roof of an electric vehicle 112, in accordance with an embodiment. FIG. 3 illustrates a side view of the electric vehicle shown in FIG. 2 with the electromagnetic power receiving device 100 thereon, in accordance with an embodiment. The electromagnetic power receiving device 100 can comprise a pressure-sensitive adhesive that can adhere to the electric vehicle 112. The bottom of the charging pad 102 can comprise the aforementioned pressure-sensitive adhesive, which allows the charging pad 102 and hence the overall electromagnetic power receiving device 100 to adhere to the roof of the electric vehicle 112. The electromagnetic power receiving device 100 can be wired through the roof, seams, or door opening into the electric vehicle's 112 charging electronics that are also associated with the charging port 89 typically located on electric vehicles to receive a charging plug and cable arrangement from non-electromagnetically based electric vehicle charging stations.

The electric vehicle 112 can include one or more batteries such as the EV battery 103 shown in FIG. 1. That is, the EV battery 103 may be used as a battery (or battery bank) for the electric vehicle 112. In the configuration shown in FIG. 2 and FIG. 3, the electromagnetic power receiving device 100 is shown located on the roof of the electric vehicle 112. The charging coil 104 of the electromagnetic power receiving device 100 can communicate electrically with the EV battery 103 associated with the electric vehicle 112 through charging system electronics 615 (see FIG. 10) as discussed above.

An electromagnetic power receiving device 100 can be connected electrically to the electrical charging system module (e.g., see charging system module 615 shown in FIG. 10) of the electric vehicle 112. The charging coil 104 contained on or in the charging pad 102 can also be electrically connected to the electric vehicle's charging port 89, as indicated by dashed line 83 in FIG. 2 and FIG. 3. The dashed line 83 represents, for example, an aftermarket electrical connection between the charging system 615 associated with the electric vehicle 112 and the charging coil 104. In an embodiment, the electrical wiring and cabling necessary to implement an aftermarket electrical connection between the charging coil 104 and the charging port 89 (and hence, the charging system of the electric vehicle 112) can be professionally hidden during installation of an aftermarket implementation and can be directly connected to the electric vehicle's charging system module 615 electronics.

Figure 10:
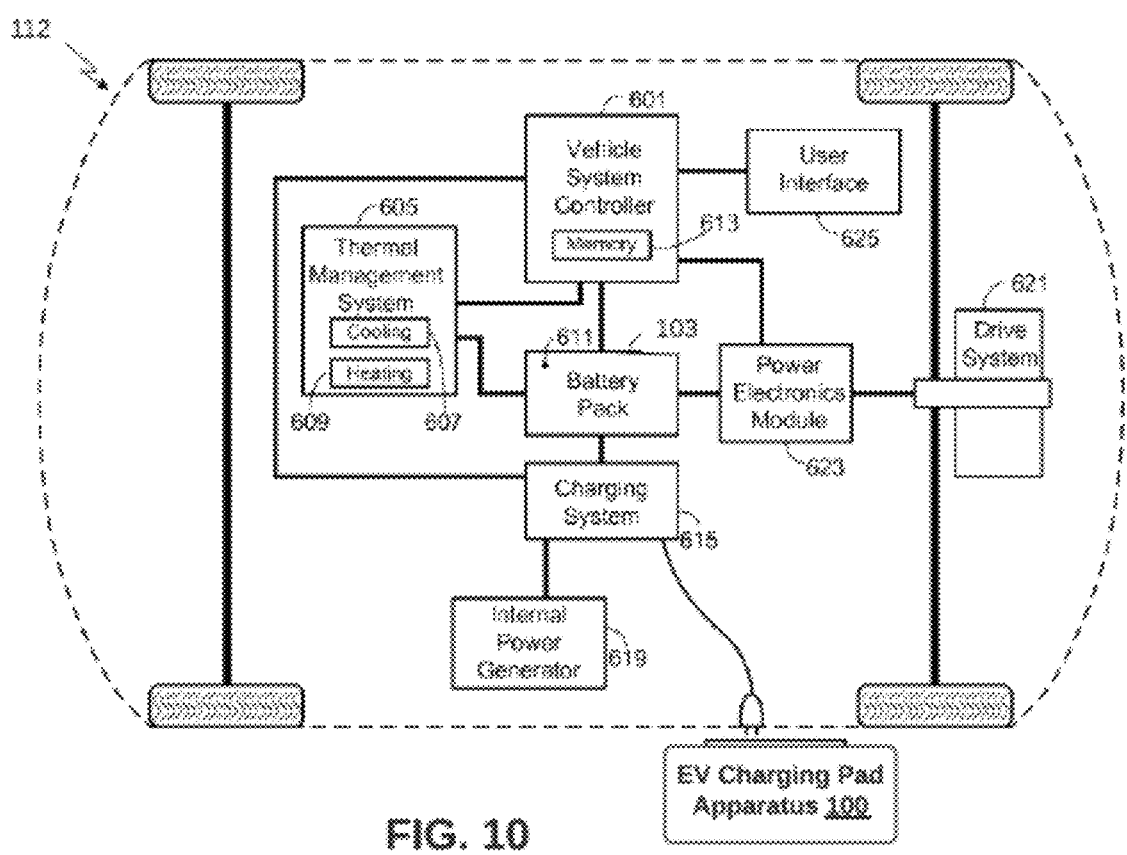
FIG. 10 illustrates a high-level view of an electric vehicle and primary vehicle subsystems, in accordance with an embodiment.

Although an aftermarket scenario is described above, it can be appreciated that some embodiments may be implemented during manufacturing. For example, the charging coil 104 can be incorporated into the body of the electric vehicle 112 during manufacturing. That is, the charging coil 104 can be installed during manufacturing of the electric vehicle 112 underneath the rooftop skin of the electric vehicle 112 between the headliner and the skin of the electric vehicle 112. The coil can then be plugged into the charging system module 615 as shown in FIG. 10. A sticker or marker can be then placed on the outer skin of the roof of the electric vehicle 112, i.e., the rooftop, so that the charging system 615 can locate the location of the charging coil 104 that is located within the skin of the electric vehicle 112. This embodiment would eliminate the use of an exterior mounted charging pads such as described earlier. A charging coil such as the charging coil 104 can also be incorporated into other surface areas of the electric vehicle 112 (e.g., hood or trunk lid). As an alternative to optically locating a vehicle embedded coil, wireless means of determining the location of the coil can be used. For example, RFID, NFC or other sensor-based technology can be utilized to locate a receiving coil within the skin of an electric vehicle. Sensor 92/94 can be configured to use wireless signals to home in on the location. Therefore, it can be appreciated that a combination of optical, wireless radio frequency, magnetic sensors could be utilized in place of sensors 92/94 discussed in FIG. 4.

In some embodiments, the charging coil 104 can be integrated or installed into a top portion (e.g., the outer skin) of the electric vehicle 112. The top portion of the electric vehicle can include, for example, a roof, a trunk, a hood, a hatchback, and a truck bed (in the case of when the electric vehicle 112 is a truck). Essentially, the top portion of the electric vehicle 112 can be any surface of the electric vehicle 112 that can be reached from above the electric vehicle 112. It should be appreciated, however, that the charging coil 104 can also be incorporated or installed in the side areas of the electric vehicle 112, which can include doors, quarter panels, fenders, bumpers, truck beds, tail gates, and the like. Some of these surfaces are depicted in FIG. 2. Note that the configuration of FIG. 2 can be modified such that the charging pad 102 is not necessary because the charging coil would be integrated within the exterior skin of the electric vehicle 112 as discussed.

Figure 4:
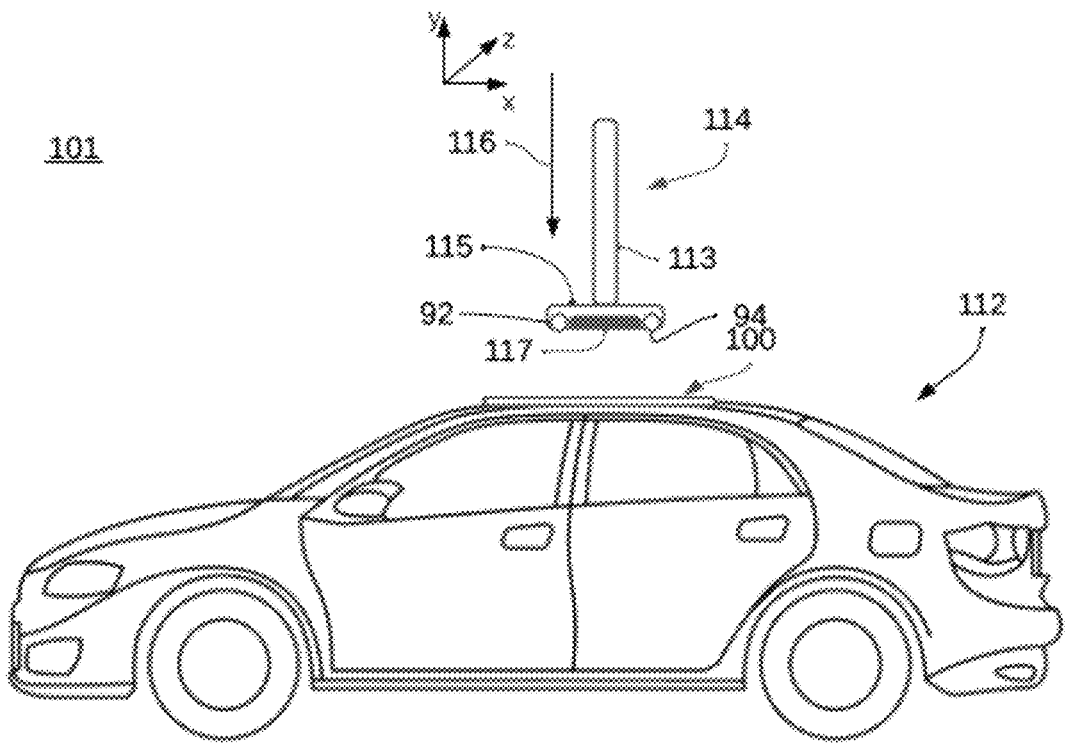
FIG. 4 illustrates a side view of an electric vehicle charging system that includes a ceiling mounted electromagnetic power transmitting device that includes a moveable and flexible charging rod connected to a charging member that includes a charging coil (i.e., transmitting coil), in accordance with an embodiment.

FIG. 4 illustrates a side view of an electric vehicle charging system 101 that includes a moveable and flexible charging rod 113 connected to a charging member 115 that includes a charge transmitting coil 117, in accordance with an embodiment. These components can collectively represent an electromagnetic power transmitting device. The charge transmitting coil 117 is an induction coil that can function as electromagnetic energy transmitting coil. The electromagnetic power transmitting device 114 is a charge transmitting device that can automatically move in a generally downward direction as indicated by arrow 116 to engage the charging coil 104 of the electromagnetic power receiving device 100 associated with the electric vehicle 112, with the charge transmitting coil 117 of the electric vehicle charging system 101. Of course, movement of electromagnetic power transmitting device 114 can also be in x-y-z directions in order to accurately place a charging member next to the charging coil 104 located on or in the electric vehicle 112.

The electric vehicle charging system 101 can be implemented as a dynamic wireless electric vehicle charging system in which a wireless transfer of energy can occur through inductive charging between an electromagnetic power transmitting device 114 including the charge transmitting coil 117 and an electromagnetic power receiving device such as charging coil 104 (receiving coil) associated with the electric vehicle 112. Note that the downward direction indicated by arrow 16 indicates a generally downward but three-dimensional direction (x-y-z) for the electromagnetic power transmitting device 114 toward the electromagnetic power receiving device represented by the electromagnetic power receiving device 100, and in particular centering on the target 90 located centrally within the charging coil 104. Examples of robotic manipulation of the device 114 is further described in FIG. 14.

Robotic manipulation can be accomplished by hardware that can include electromechanical or pneumatic hardware, such as telescoping tubing or other electromechanically or pneumatically controlled telescoping hardware to move the electromagnetic power transmitting device 114 and the transmitting coil 117 outward or inward, and also raise or lower its elevation when placing it into contact with the charging coil 104 representing the electromagnetic power receiving device 100. Without limiting the scope of the embodiments, an example of electromechanical hardware that can achieve x-y-z manipulation in the form of a robotic arm is disclosed in U.S. Pat. No. 8,887,893, which issued on Nov. 18, 2014 to Tsutsumi et al., and is incorporated herein by reference in its entirety. Another example, without intent of limitation, of hardware capable for x-y-z manipulation is U.S. Pat. No. 8,973,768 issued Mar. 10, 2015 to Jung et al., which is also incorporated herein by reference in its entirety. So, there are a variety of systems, methods, and devices, which can be utilized to provide x-y-z manipulation but has been used for other purposes such as manufacturing and surgery.

The charging member 115 can include one or more sensors 92 and 94, such as optical sensors or cameras, which may be used to identify the target 90 and guide the charging device 114 downward toward the charging coil 104 located on the charging pad 102 (or without the charging pad in the case of previously manufactured integration in the skin of the electric vehicle 112 as discussed previously). The charging device 114 can also be directed towards the charging coil 104 located on the charging pad 102 by RFID or other wireless means via sensors 92 and 94. Charging of the electric vehicle 112 thus can occur from above using the disclosed systems, rather than from below the electric vehicle as is presently implemented in conventional in-ground inductive power transfer (IPT) systems.

The electromagnetic power transmitting device 114 can be electrically connected to, for example, an electrical system of a house (e.g., within a carport or garage) or facility (e.g., such as overhands or carports located at a service station or commercial building) and can include electrical circuitry and components that provide electrical power to the electromagnetic power transmitting device 114, including the sensors 92 and 94. In some embodiments, the sensors 92 and 94 can be powered by small rechargeable batteries encased in the electromagnetic power transmitting device 114. In other embodiments, the electromagnetic power transmitting device 114 may be mounted to a boom (e.g., a portable boom or robotically operated boom) with a boom arm that extends above the electric vehicle. The electromagnetic power transmitting device 114 can be mounted to, for example, the boom arm of such a boom. The boom arm in this case can be positioned above the electric vehicle using X-Y-Z robotic systems as discussed herein.

Note that the term 'optical sensor' as used herein can relate to electro-optical sensors, which are electronic detectors that can detect light, or a change in light, into an electronic signal. These sensors are able to detect electromagnetic radiation from the infrared up to the ultraviolet wavelengths. An optical sensor may be, for example, a position sensor that can activate when an object interrupts a light beam or a photoelectric sensor that can detect the distance, absence, or presence of an object or target. Optical sensors can also be provided in the form of cameras. A video camera, for example, in combination with artificial intelligence or machine learning can be trained to identify the location of the electromagnetic power receiving device 100 in the form of a charging pad 102 or charging coil 104 on a particular electric vehicle.

Both the electromagnetic power receiving device represented by a charging coil 104 and the electromagnetic power transmitting device represented by a charge transmitting coil 117 can be inductive coils. The charging coil 104 and the charge transmitting coil 117 can be referred to or configured as "loop" antennas, and more specifically, multi-turn loop antennas. The induction coils 104 and 117 can also be referred to herein or be configured as "magnetic" antennas. The term "coil" is intended to refer to a component that can wirelessly output or receive energy four coupling to another "coil." The coil may be an "antenna" of a type that can be configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling. Note that the use of a loop antenna or "antenna" as discussed above for implementing a coil is not a limiting feature of the embodiments but is discussed herein for exemplary purposes.

Efficient transfer of energy between an electromagnetic power transmitting device (charge transmitting coil) and electromagnetic power receiving device (charge receiving coil) may occur during matched or nearly matched resonance between a transmitter and a receiver. Further, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

According to some embodiments, coupling power between two induction coils that are in the near field of one another is disclosed. The near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 5:
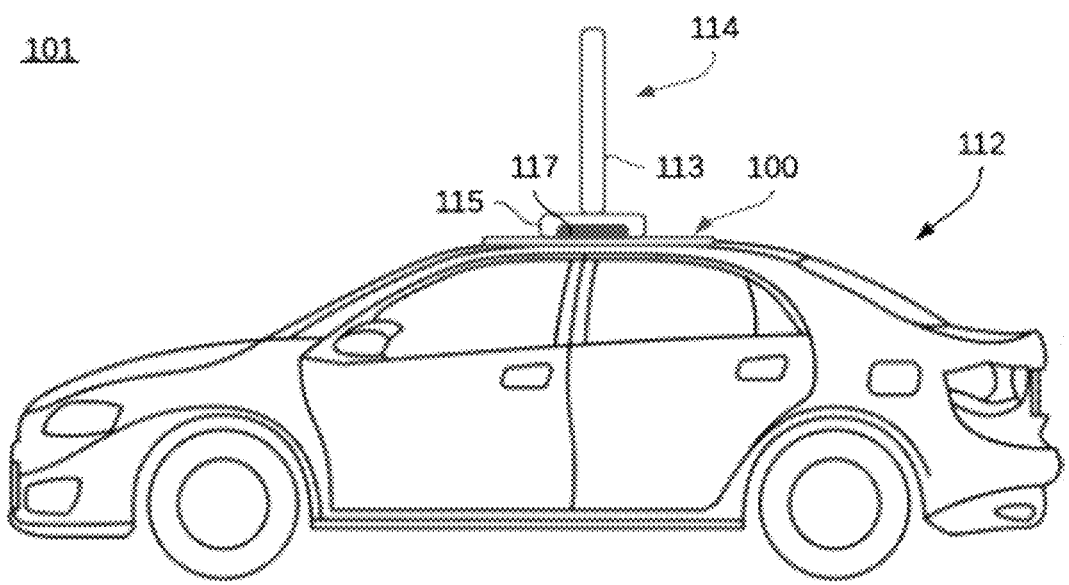
FIG. 5 illustrates a side view of the electric vehicle charging system shown in FIG. 4 with the ceiling mounted electromagnetic power transmitting device engaged in an inductive charging position, in an accordance with an alternative embodiment.

FIG. 5 illustrates a side view of the electric vehicle charging system 101 shown in FIG. 4 with the electromagnetic power transmitting device 114 engaged in an inductive charging position, in an accordance with an alternative embodiment. The electromagnetic power transmitting device 114 may be connected or mounted to a structure above the electric vehicle 112. Examples of such a structure may be a ceiling structure such as a ceiling of a garage, carport or bay generally located above the electric vehicle 112. In some embodiments, the structure may be a portable boom carried by an autonomous service vehicle, which will be further described.

In the embodiment depicted in FIG. 5, the charging coil 104 can be engaged in wireless inductive charging with the charging transmitting coil 117. Thus, the EV battery 103 of the electric vehicle 112 can be charged via wireless inductive charging when the charging member 115 (e.g., a charging plate that includes the charge transmitting coil 117) is engaged with the electromagnetic power receiving device 100.

Figure 6:
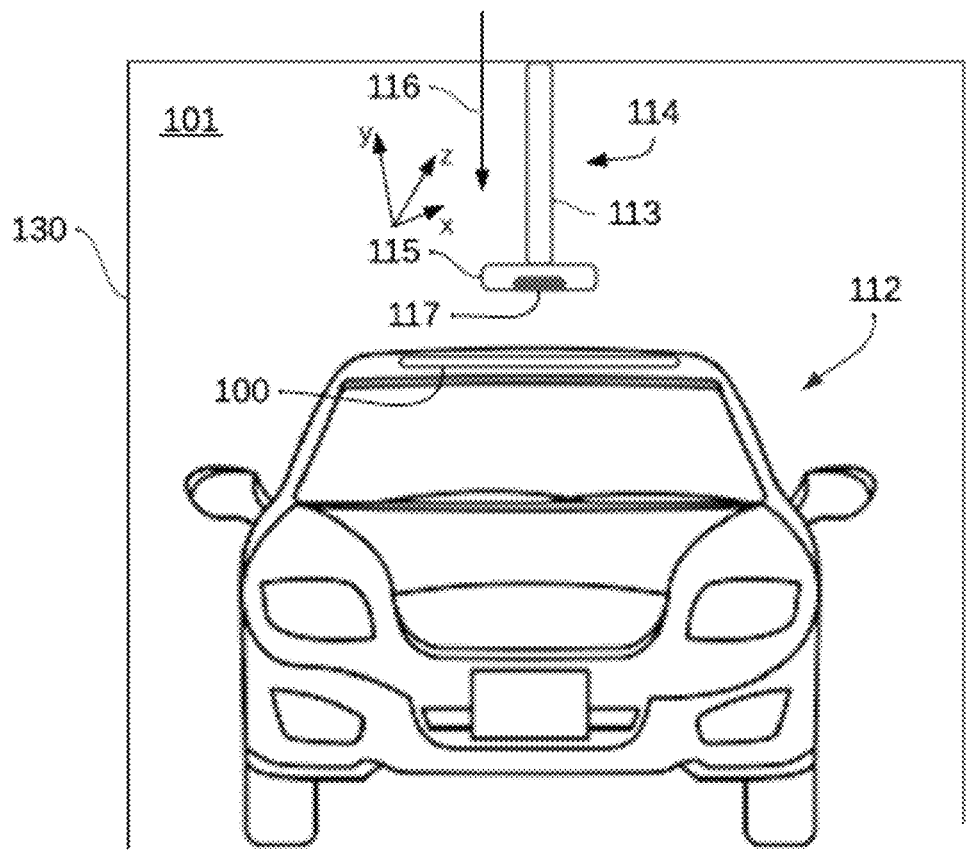
FIG. 6 illustrates a front view of an electric vehicle charging system, in accordance with an embodiment.

FIG. 6 illustrates a front view of the electric vehicle charging system 101, in accordance with an embodiment. In the embodiment depicted in FIG. 6, the electric vehicle charging system 101 may be implemented with a structure 130, such as for example, a garage or bay. The electromagnetic power transmitting device 114 may be mounted to a ceiling of the structure 130. Although the sensors 92 and 94 are not shown in FIG. 6, as discussed above, the charging member 115 may support and maintain the sensors 92 and 94. The structure 130 may be, for example, a ceiling structure or in some cases, a fixed or portable boom providing x-y-z robotics manipulation.

Figure 7:
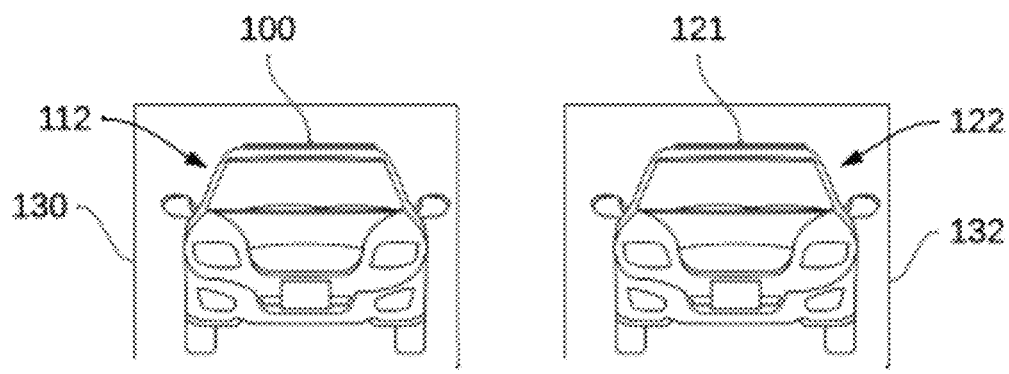
FIG. 7 illustrates a front view of an electric vehicle charging system, in accordance with another embodiment.

FIG. 7 illustrates a front view of multiple structures for charging multiple electric vehicles, in accordance with an embodiment. In FIG. 7, multiple structures 130 and 132, which may be bays (e.g., multiple charging bays for charging a fleet of electric vehicles, or where several charging station are publicly accessible such as at a service station) can be implemented. In addition to an electric vehicle 112 located in the structure 130 (as shown in FIG. 6), one or more additional structures (e.g., bays) such as structure 132 (which is similar to structure 130) can be implemented for charging another electric vehicle 122 which has a charging pad apparatus 121 thereon, similar to the electromagnetic power receiving device 100. That is, the electric vehicle 122 can be charged via wireless inductive charging via the charging pad apparatus 101 as discussed previously herein.

Figure 8:
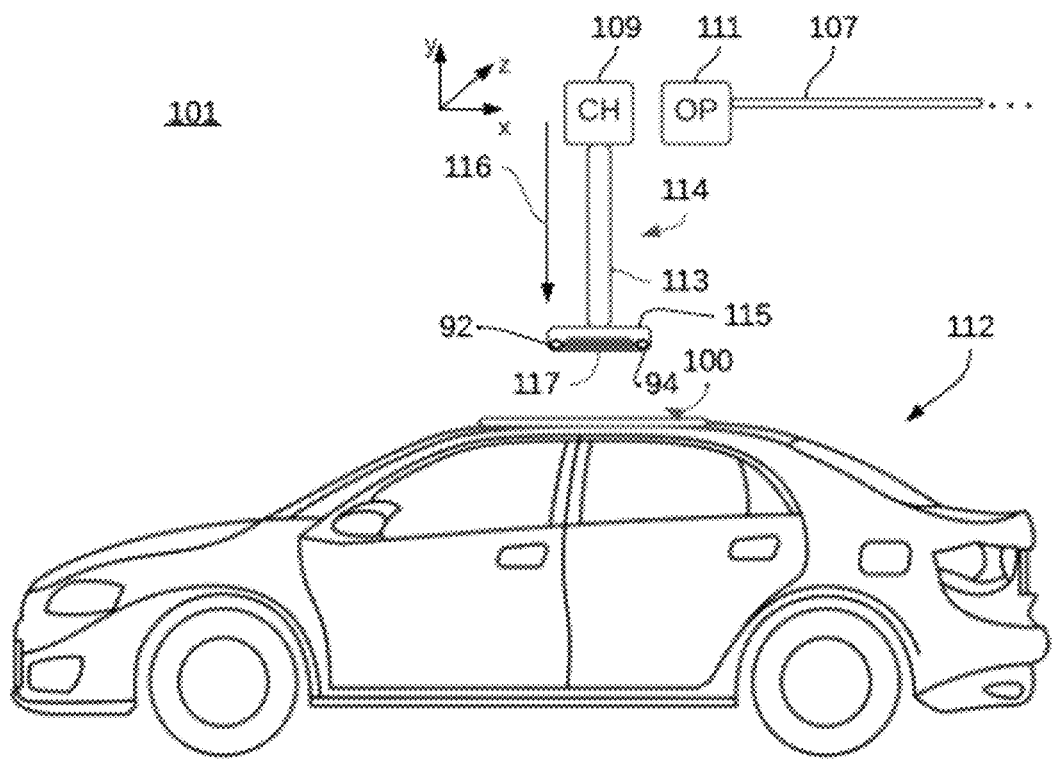
FIG. 8 illustrates a side view of an electric vehicle charging system associated with a garage door opener, in accordance with an embodiment.

FIG. 8 illustrates a side view of an electric vehicle charging system 101 associated with a garage door opener, in accordance with an embodiment. In the embodiment depicted in FIG. 8, the charging device 114 of the electric vehicle charging system 101 can be mounted to a charging receptacle 109, which in turn can be mounted to a ceiling or other structure (e.g., as part of a boom). Thus, the charging device 114 including the flexible charging rod 113 and the charging member 115 can extend and hang from the charging receptacle 109 ("CH"). The charging receptacle 109 can be located near a garage door opener 111 ("OP") which in turn can be connected to a track or rail 107 (of the type typically used with garage door openers).

The garage door opener 111 can be implemented as or in the context of a garage door opener system in which a motor drives a trolley or carriage along the rail 107. The trolley can be connected to a garage door, and as the trolley moves, it pulls the door open or pushes it closed. In an embodiment, the garage door opener 111 may be a chain-drive garage door opener that uses a metal chain to drive the trolley and raise or lower the door. In another embodiment, the garage door opener 111 may be a belt-drive garage door opener functions similarly to the chain-drive system but uses a belt rather than a chain to move the trolley.

In yet another embodiment, the garage door opener 111 may be implemented as a screw-drive garage door opener that can use a threaded steel rod to move the lifting mechanism. As the rod rotates, it can drive the trolley along the track or rail 107 to raise or lower the door. In still another embodiment, the garage door opener 111 may be a direct-drive garage door opener in which the motor itself functions as the trolley and travels along the track or rail 107, raising or lowering the door. This means the system has a single moving part, the motor, the use of which can result in reduced noise and vibration, as well as fewer maintenance requirements.

Figure 9:
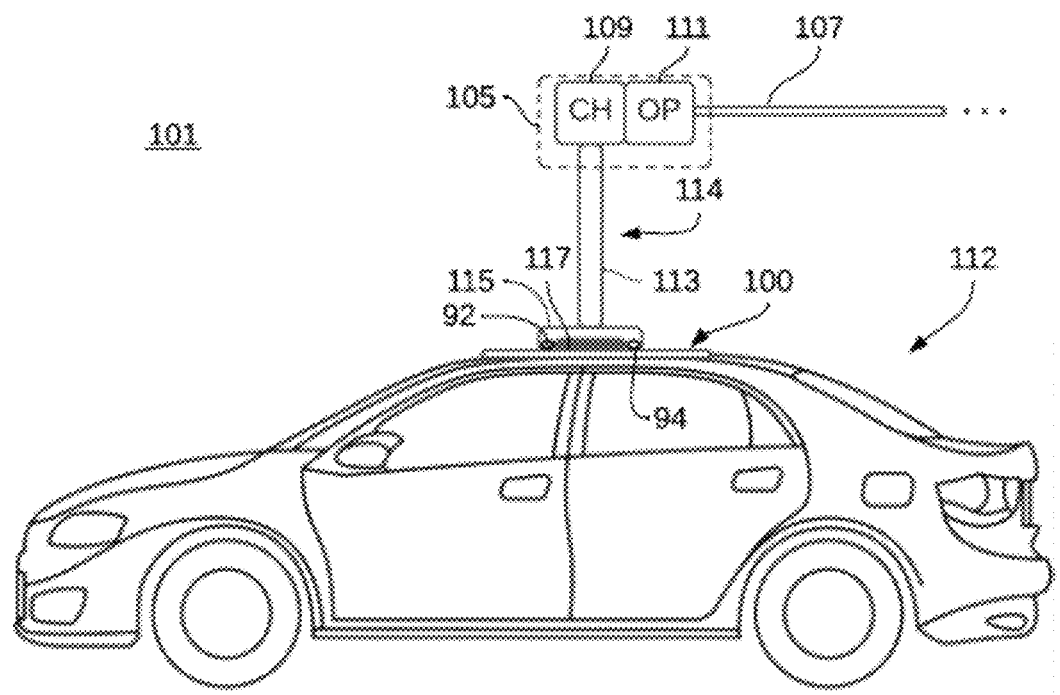
FIG. 9 illustrates a side view of an electric vehicle charging system in an integrated garage door opener arrangement, in accordance with an embodiment.

FIG. 9 illustrates a side view of the electric vehicle charging system 101 in an integrated garage door opener arrangement, in accordance with an embodiment. In the example shown in FIG. 9, the charging receptacle 109 may be integrated with the garage door opener 111 in charging unit 105 that integrates the operability of the charging receptacle 109 and the garage door opener 111. In other words, the charging receptacle 109 and the garage door opener can be combined into a single operating unit that operates both electrically and mechanically the operations of the garage door opener 111, the charging receptacle 109 and the various components described previously such as the electromagnetic power transmitting device 114, which in this case hangs from the charging unit 105. Note that the charging unit 105 may be a receptacle that houses the garage door opener 111 and the charging receptacle 109.

Note that an example of a garage door opener and related components and systems that can be used to implement the garage door opener 111, is disclosed in non-limiting U.S. Patent Application No. 20200325717A1, which published on Oct. 20, 2020, and is incorporated herein by reference in its entirety. The garage door opener 111 can include and/or involve the use of a garage door opening system along with components and features such as garage door electric operators, garage door overhead lighting, remote control devices, and so on.

FIG. 10 illustrates a high-level view of the electric vehicle 112 and primary vehicle subsystems, in accordance with an embodiment. It will be appreciated that the electric vehicle 112 can utilize other subsystem configurations while still retaining the capabilities of the embodiments. As shown, the electric vehicle 112 can include a vehicle control system 601 that can monitor and control the general operation of the various vehicle subsystems.

System controller 601 can be coupled to the battery pack 103 and a thermal management system 605. Thermal management system 605, which preferably includes both a cooling subsystem 607 and a heating subsystem 609, can be used to control battery pack temperature and can be preferably coupled to other vehicle thermal systems, e.g., drive train cooling, passenger cabin HVAC system, etc. In some embodiments, the controller 601 among a variety of controlling operations, may monitor the temperature of the cells within the battery pack 103 using one or more sensors 611 and can control the temperature of the battery pack 103 (i.e., 'the battery') using thermal management system 605 in order to achieve a desired battery pack operating and/or storage temperature.

In addition to monitoring battery pack temperature, vehicle control system 601 can also monitor the state of charge (SOC) of battery pack 103 as well as the rate of battery discharge, both during vehicle operation and vehicle storage. In addition, in at least one embodiment the system 601 can monitor and store in an on-board memory 613 the number of charging cycles to which the battery has been subjected. Preferably for each charging cycle the cut-off voltage and other charging parameters are monitored and stored in memory 613, thereby providing information that can be used to gauge the relative health of battery pack 103 throughout its expected lifetime.

Control system 601 can be coupled to a charging system 615 that controls and monitors cut-off voltage during charging. Charging system 615 may also control and monitor the charge rate. Charging system 615 may either be an external system or integrated within vehicle control system 601. In at least one embodiment, charging system 615 is external to the control system 601. In such an embodiment, preferably the portion of the charging module that converts external power to a power level (e.g., voltage) that is compatible with battery pack 103 is external to the vehicle while a second portion of the charging module that controls charging characteristics such as cut-off voltage, charging rate, etc. is internal to the vehicle. Alternately, the entire charging module can be external to the power control subsystem 601 and the vehicle.

In an embodiment, the battery pack 103 can connect electrically to the electromagnetic power receiving device 100 for electrical connection to the charging coil 104 contained on or integrated with the charging pad 102 as discussed previously herein. Electrical connection between the battery pack 103, charging system 615 and the electromagnetic power receiving device 100 can be facilitated by a charging system 615 associated with the electric vehicle 112.

The charging system 615 can ensure that the power provided via wireless inductive charging as discussed previously can be, if necessary, converted to a form of power storable by the battery pack 103. For example, the charging system 615 typically includes an AC to DC rectifier in order to convert power to that required by battery pack 103. In an embodiment, the battery pack 103 may be charged in whole or in part by a power generator 619 if one is contained within the vehicle, i.e., an on-board power generator, which is coupled to the battery pack via charging system 615.

It will be appreciated that in some embodiments, while an external power source is preferred for providing a full charge to battery pack 103, internal power source 619 can be used to augment the charge within the battery pack 103, for example by charging battery pack 103 during vehicle use, thereby extending driving range. In most cases, however, the battery pack 103 of the electric vehicle 112 will still require charging from an external power source such as facilitated by the electromagnetic power receiving device 100. Note that in some embodiments, the internal power source 619 may be a regenerative braking system.

The power control subsystem 601 can also control the power coupled from battery pack 103 to vehicle propulsion motor 621, for example using a power electronics module (PEM) 623. Power electronics module 623 is used to ensure that the power delivered to motor 621 has the desired voltage, current, waveform, etc. Thus, for example, PEM 623 preferably includes a DC to AC inverter, as well as the necessary control circuitry/processor to implement the various selectable modes as described in detail below. It will be appreciated that vehicle propulsion motor 621 can be comprised of a single electric motor or multiple electric motors.

User interface 625 is preferably integrated into the vehicle's user interface, although the user interface 625 can be implemented in other ways as described in detail below. The user interface 625 provides a means for a user to control the selection of the vehicle's operational mode as well as associated parameters. Preferably, the user interface 625 can also provide means for identifying which mode the vehicle is in at any given time, as described further below.

Figure 11:
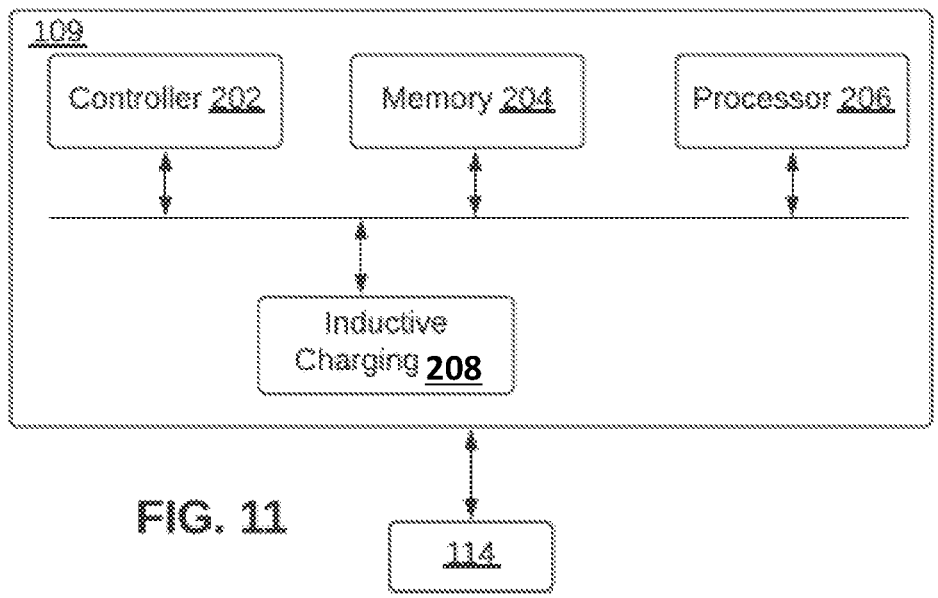
FIG. 11 illustrates a block diagram depicting operational components of the charging device, in accordance with an embodiment.

FIG. 11 illustrates a block diagram depicting operational components of the charging receptacle 109, in accordance with an embodiment. As shown in FIG. 11, the charging receptacle 109, which as indicated previously can be mounted to a ceiling of a structure such as a garage, a car port, a boom, or a bay, can include a controller 202 electronically and bidirectionally connected to a memory 204, a processor 206, and an inductive charging module 114. The processor 206 may be a processor such as, for example, a microprocessor or central processing unit (CPU) comprising electronic circuitry that executes instructions including a computer program. The processor 206 can perform arithmetic, logic, controlling and input/output (I/O) operations specified by the instructions in the computer program.

The memory 204 can server as storage (e.g., main memory, internal memory, prime memory, etc.) that is accessible by the processor 206. The processor 206 can read instructions stored in the memory 204 and then execute the instructions as required. Any data actively operated on can be stored in the memory 204 in a uniform manner. The memory 204 may be, for example random access memory (RAM) and/or read only memory (ROM). The controller 202 may be a hardware device and/or a software program that can manage or direct the flow data between two entities. The controller 202 can also comprise a microchip or hardware device operable to control other devices or components, such as, for example, the electromagnetic power transmitting device 114 including robotics such as the robotic arm 113 connected to the charging member 115 and the charge transmitting coil 117. The controller 202 can also control the operations of an inductive charging module 208. In some embodiments, the controller 202 may be implemented as a microcontroller that can interface between two or more systems and manage communications between them.

Figure 12:
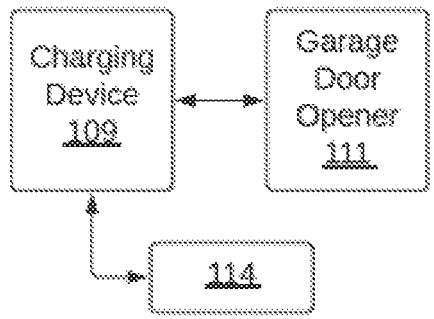
FIG. 12 illustrates a block diagram of the charging device connected electrically to the garage door opener, in accordance with an embodiment.
Figure 13:
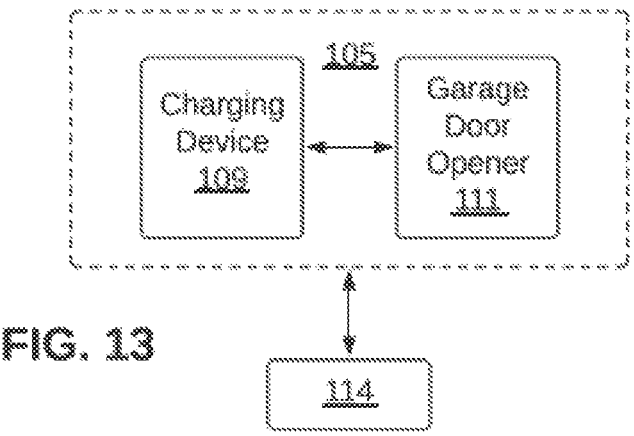
FIG. 13 illustrates a block diagram of the charging unit including the electric vehicle charging system and the garage door opener.

The inductive charging module 208 can facilitate inductive wireless charging as discussed herein. That is, the inductive charging module 208 can provide electricity to the electromagnetic power transmitting device 114 robotically through the robotic arm 113 to the charge transmitting coil 117. The charging receptacle 109, which can include the inductive charging module 208, may be connected to an AC power outlet (such as available in an infrastructure of a garage). In some embodiments, the inductive charging module 208 may function as a power management module and/or inductive power transfer (IPT) system power management module. The FIG. 12 illustrates a block diagram of the charging receptacle 109 connected electrically to the garage door opener 111, in accordance with an embodiment. FIG. 13 illustrates a block diagram of the charging unit 105 including the charging receptacle 109 and the garage door opener 111.

Figure 14A:
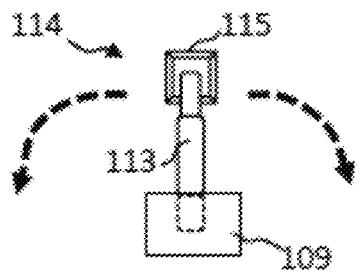
FIGS. 14A-14B illustrate robotics associated with an electric vehicle charging system, in accordance with an embodiment.
Figure 14B:
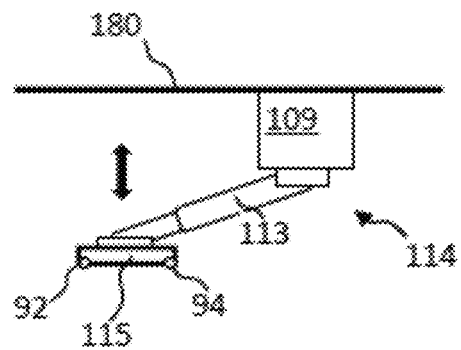

Referring to FIGS. 14A-14B, an example of robotics for x-y-z manipulation of an electromagnetic power transmitting device 114 are illustrated. FIG. 14A depicts a top view (e.g., looking downward from, for example, a ceiling or other structure) onto the electromagnetic power transmitting device 114. The dashed arrows depicted in FIG. 14A indicate that the robotic arm 113 can be rotated leftward and rightward to move the charging member 115 into place over the electromagnetic power receiving device 100 associated with an electric vehicle. FIG. 14B shows a side view of the electromagnetic power transmitting device 114 mounted to a structure 180 (e.g., a ceiling or other structure). What is further shown is that the robotic arm 113 can also move vertically to place the charging member 115 into closer proximity or into contact with the electromagnetic power receiving device 100.

Figure 15A:
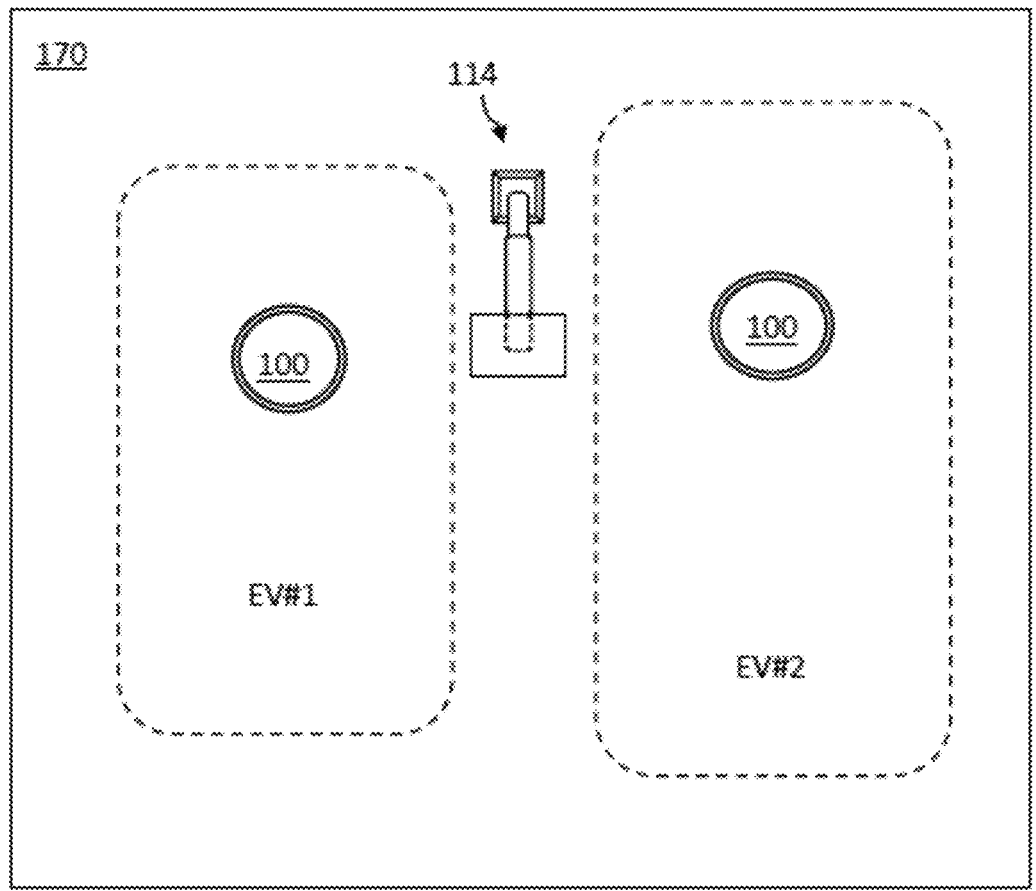
FIGS. 15A-15C illustrates a two-vehicle garage with an electric vehicle charging system installed above and between two electric vehicles, EV #1 and EV #2 parked within a garage or bay, in accordance with an embodiment.
Figure 15B:
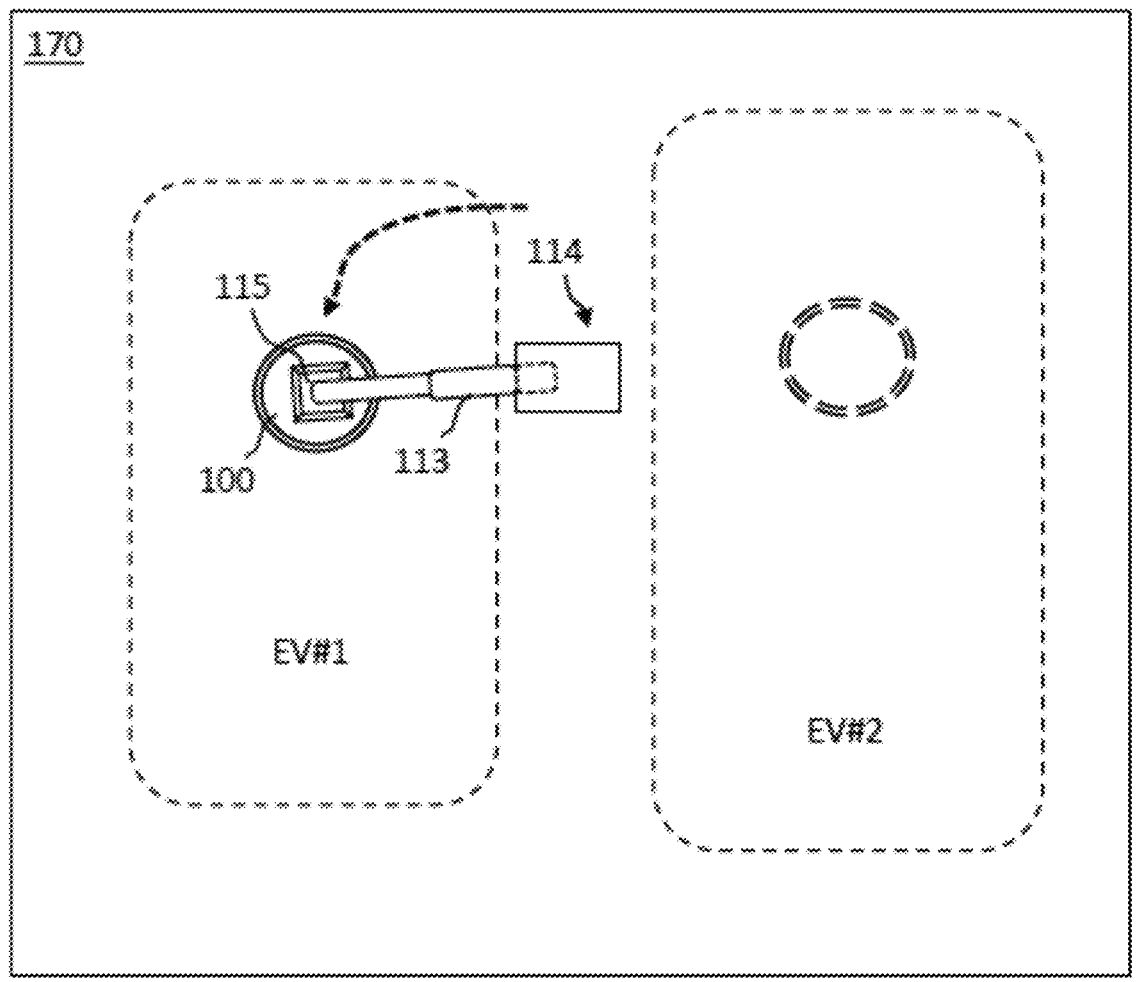
Figure 15C:
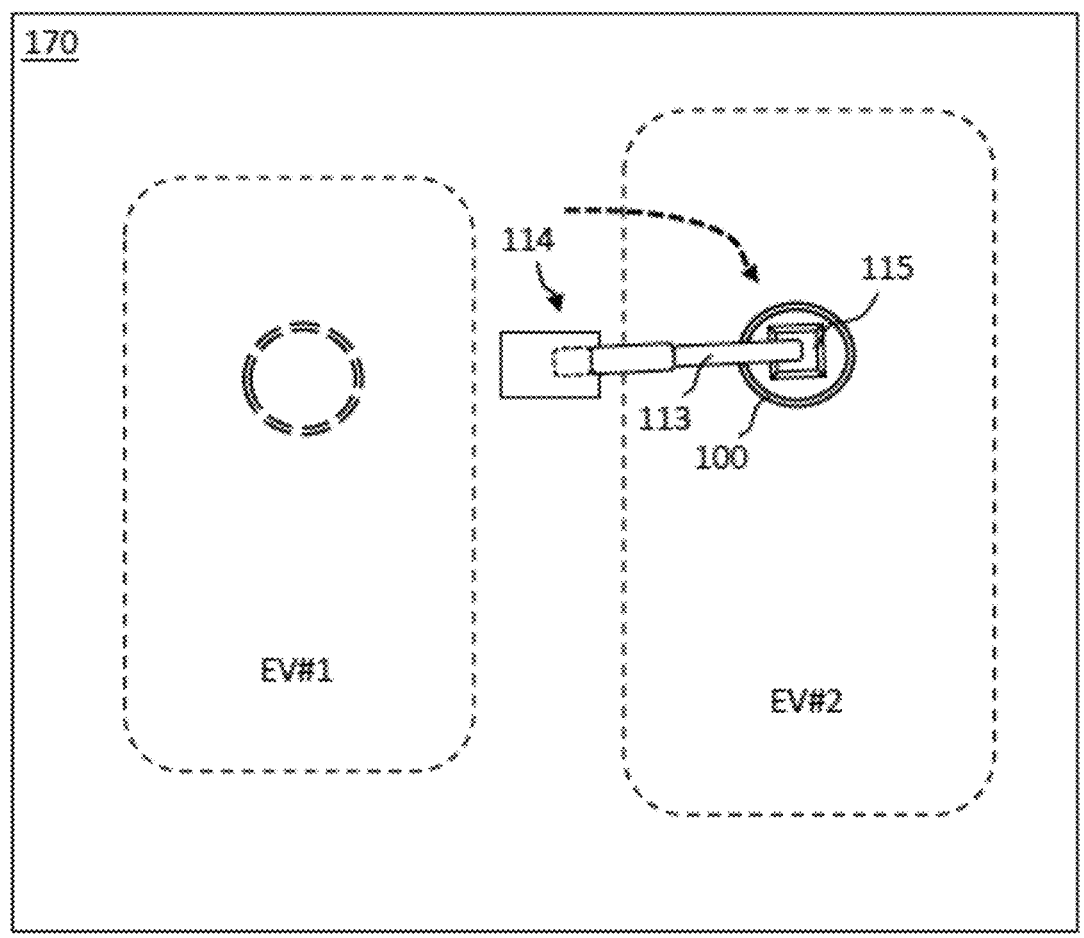

FIGS. 15A-15C illustrate a two-vehicle garage 170 with an electromagnetic power transmitting device 114 installed above and between two electric vehicles, EV #1 and EV #2 parked within the garage 170. In FIG. 15A, the charging device 114 is shown mounted above and in-between the electric vehicles, and the robotic arm 113 is shown in a stored location between the vehicles, in front of the charging receptacle 109. In FIG. 15B, the robotic arm 113 of the charging device 114 is shown rotated to the left over EV #1 where it becomes located above charging pad 100 associated with EV #1.

In FIG. 15C, the robotic arm 113 of the electromagnetic power transmitting device 114 is shown rotated to the left over EV #2 where it can become located above the electromagnetic power receiving device 100 associated with EV #2. FIGS. 15A-15C illustrate how a single electromagnetic power transmitting device 114 can be shared by two vehicles in, for example, a garage installment given the inclusion of robotics that can enable the manipulation/location of the robotic arm 113 and the charging member 115 in the correct location to properly charge an electric vehicle electromagnetically via the electromagnetic power receiving device 100, which can be mounted on or in the EV as previously discussed.

Figure 16:
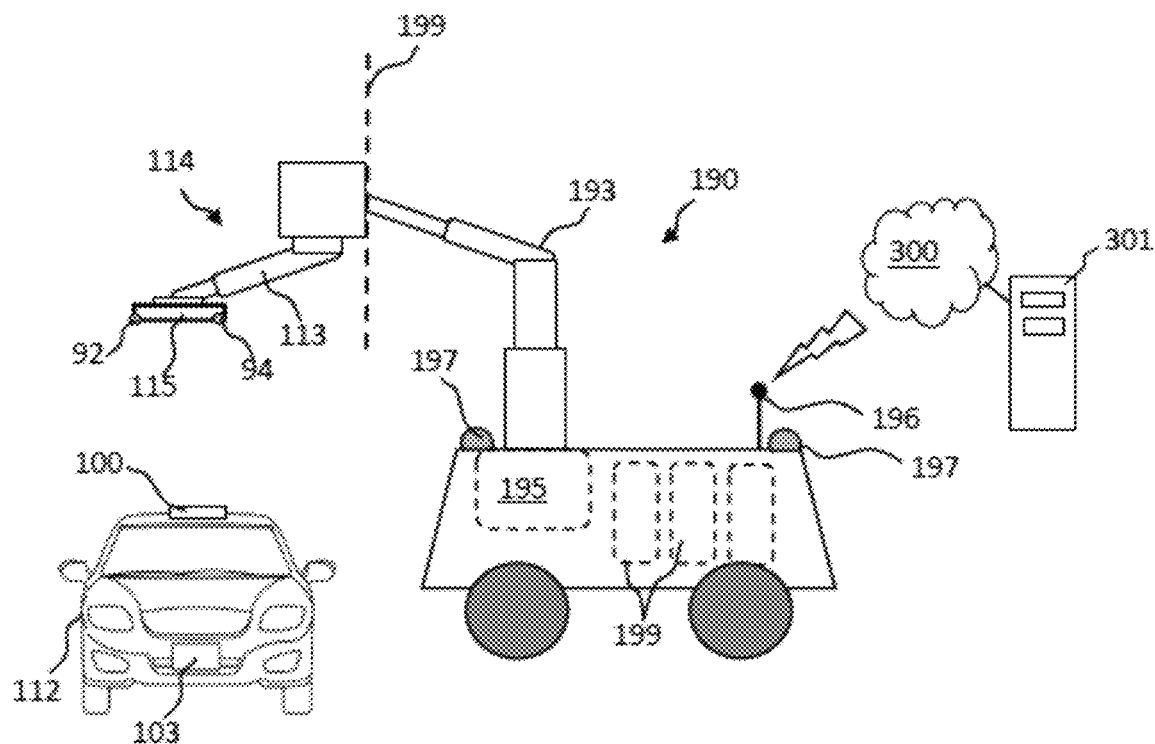
FIG. 16 illustrates an electromagnetic power transmitting device mounted to a boom associated with a service vehicle, in accordance with an embodiment.

Referring to FIG. 16, illustrated is a service vehicle 190 carrying an electromagnetic power transmitting device 114 in association with a boom 193, in accordance with an embodiment. The service vehicle 190 as depicted can be an autonomous vehicle that can be directed to electric vehicles requiring charging using any combination of cameras and LIDAR system represented by optics module 197. Electric vehicle may be located by the service vehicle 190 in, for example, a parking lot or parking garage of a business, or public parking structure. An electric vehicle 112 can be part of a service wherein a request can be made by an owner of the electric vehicle 112 over a mobile software application on a mobile device to locate and charge the electric vehicle. The electric vehicle can be identified by its license plate 103 optically by optics modules. 197 (e.g., a video camera). The electromagnetic power transmitting device 114 mounted on/with the service vehicle 190 can be essentially as described in the foregoing disclosure. Line 199 is provided to show what is added in this embodiment with the inclusion of the service vehicle 190. Electromagnetic charging can occur according to what has already been taught in the foregoing disclosure wherein the charging member 115 (transmitting coil) is placed by boom 113 into closer proximity or into contact with the electromagnetic power receiving device 100 (receiving coil) to charge the electric vehicle 112. Accurate placement for charge efficiency is facilitated by sensors 92/94.

When included with a service vehicle 190, it is possible to provide electric vehicle charging without the electromagnetic power transmitting device 114 being mounted to a fixed structure. In this situation, the electromagnetic power transmitting device 114 may be mounted to a boom 193 associated with the service vehicle 190. The service vehicle can be autonomous. It can be controlled and monitored wirelessly 196 via the cloud 300, remote servers 301, and can benefit from artificial intelligence and distributed ledger technology for purposes of maintaining accounts, contracts and service schedules. The service vehicle 190 can include a controller 195 for local system control and remote communications, and a bank of batteries 197 for providing electric charging capability to the electromagnetic power transmitting device 114.

Alternatively, the bank of batteries 199 can be replaced by an electric generator as 199 where fuel used to power a generator that provide the electric power for electromagnetic power generation by the electromagnetic power transmitting device 114. The boom 193 can enable the electromagnetic power transmitting device 114 to be placed over an electric vehicle 112 so that the charging member 115 can be placed in contact with or near the charging pad 100. Service vehicle can be outfitted with sensors, video cameras, and electro-mechanical hardware necessary for it to be navigated to an electric vehicle 112 requiring electric charging. Sensor, video cameras and hardware already described with respect to the electromagnetic power transmitting device 114 can also be included to maneuver the charging member 115 into place above the electric vehicle 112 where it can be in contact or near the electromagnetic power receiving device 100.

Note that due to the inherent misalignment variations in dynamic wireless electric vehicle charging systems such as disclosed herein, it can be important to implement effective misalignment detection and correction techniques to maximize the amount of energy received by the electric vehicle 112. Thus, the various types of sensors such as discussed herein may be used to direct the electromagnetic power transmitting device 114 with misalignment detection and correction techniques toward the electromagnetic power receiving device 100.

An electric vehicle charging service can be provided in, for example, commercial settings (e.g., parking lots, parking garages, etc.) using the service vehicle 190 as described. In other embodiments, the service vehicle 190 can be provided to owners of electric vehicles on a subscription basis so that the electric vehicles can become charged as they are parked by owners in a parking lot. The service vehicle 190 can also be ordered using a mobile device application or "app" such as those used to order a vehicle for a rideshare (e.g., Uber, Lyft, etc.).

The term "app" as utilized herein can refer to an application or software application such as a software program. An 'app' can refer to software or software programs used on a mobile computing device such as a smartphone, a tablet computing device, a wearable computing device, and so on. In other embodiments, an 'app' may refer to a "web app" or "online app" such as software that a user can access and use while online, via for example, a browser, instead of residing on a client device. In some embodiments an "app" may be a software application that can be resident on and/or run on a mobile computing device, while and in other embodiments the mobile app may be accessed and used online via a client device such as a mobile computing device (e.g., smartphone, tablet, laptop computer, etc.), a computer server, a desktop computer, and so on.

A non-limiting example of a mobile application or mobile 'app' that can be adapted for use with an embodiment as an "app" that can be used to request the service vehicle 190 and associated services is disclosed in U.S. Pat. No. 10,834,174, which issued on Nov. 20, 2020 and is incorporated herein by reference in its entirety. A non-limiting example of a method and apparatus that can be utilized with a mobile app for implementing and managing a service request for the service vehicle 190 is disclosed in U.S. Patent Application Publication No. 20190087446, which published on Mar. 21, 2019.

The service vehicle 190 can be trained with machine learning and artificial intelligence to locate and charge an electric vehicle that is located within the service vehicles area of assigned operation. Owners can then be charged a fee after an electric charge is completed. Charges can be based on time, power transfer, or other basis and can be tracked and billed wirelessly using cloud or distributed ledger resources.

Figure 17:
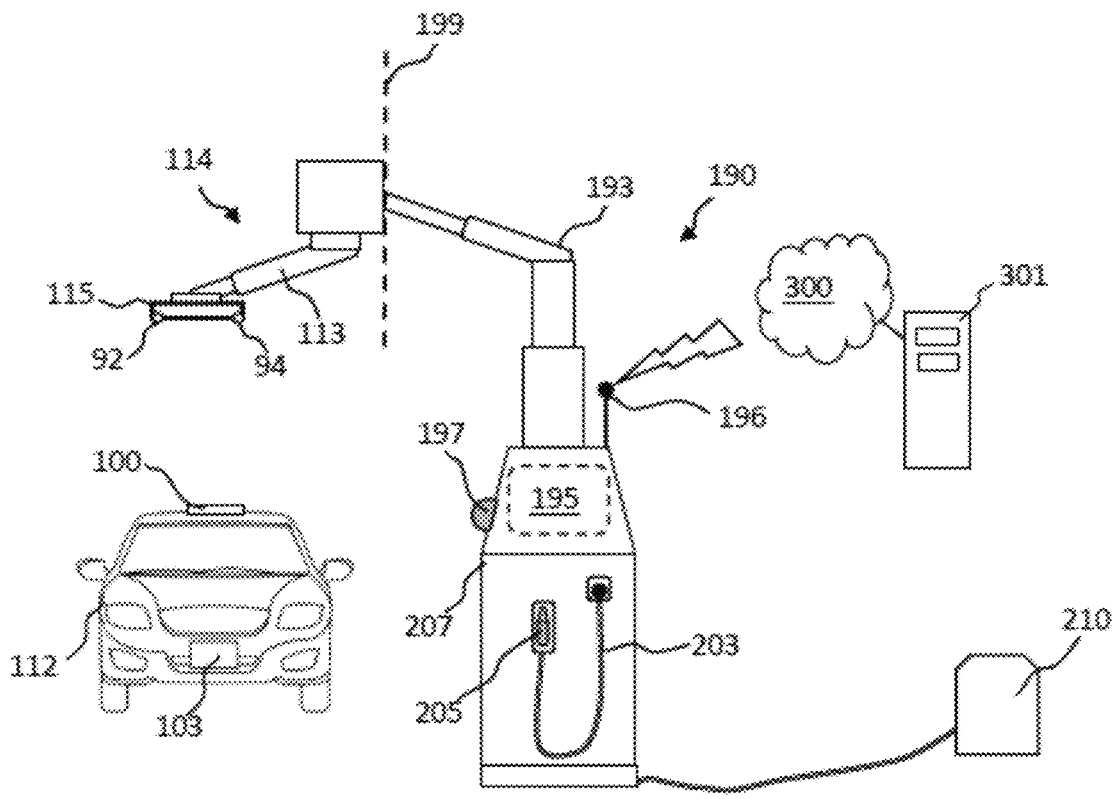
FIG. 17 illustrates an electromagnetic power transmitting device mounted to a boom associated with a ground mounted charging station, in accordance with an embodiment.

Referring to FIG. 17, illustrated is a ground mounted charging station 207 carrying an electromagnetic power transmitting device 114 in association with a boom 193 mounted to the top of the ground mounted charging station 207, in accordance with an embodiment. The electromagnetic power transmitting device 114 can be essentially as described in the foregoing disclosure. Line 199 is provided to show what is added in this embodiment with the inclusion of the boom 193 and the ground mounted charging station 207. Electromagnetic charging can occur according to what has already been taught in the foregoing disclosure wherein the charging member 115 (transmitting coil) into closer proximity or into contact with the electromagnetic power receiving device 100 (receiving coil) to charge the electric vehicle 112.

When wireless charging capabilities are included with a ground mounted charging station 207, it is possible to provide wireless electric vehicle charging in addition to cable-based charging in a single, integrated system. Here, the electromagnetic power transmitting device 114 is being mounted to a ground-based EV Charging Station apparatus commonly used to charge electric vehicles today. In this situation, the electromagnetic power transmitting device 114 may be mounted to a boom 193 associated with the ground mounted charging station 207 that can also have cable-based charging capabilities via a power cable 203 and plug 205 that is connected to an electric vehicle port. The ground mounted charging station 207 can include a controller 195 for local system control and remote communications. The ground mounted charging station 207 can be controlled and monitored wirelessly 196 via the cloud 300, remote servers 301, and can benefit from artificial intelligence and distributed ledger technology for purposes of maintaining accounts, contracts and service schedules. The boom 193 can enable the electromagnetic power transmitting device 114 to be placed over an electric vehicle 112 so that the charging member 115 can be placed in contact with or near the charging pad 100. The vehicle can be recognized by sensor 197, which can be a video camera that recognizes the license plate associated with the electric vehicle 112, or recognition can be carried out wirelessly by the sensor 197 (e.g., RFID, NFC, Bluetooth).

Bidirectional charging between electric vehicle charging stations and electric vehicles has been shown to be useful during situations where power to a premises is lost. Currently, electrically connected charging systems are available that enable the electric vehicle to serve as a power supply for a premises when power is disrupted to the premises. This is only available for physically connected electrically in interfaces, where a charging gun 205 at the end of a cable 203 is plugged into the electric vehicle. It can be appreciated after the detailed teaching contained herein that bidirectional electromagnetic power transfer can occur from the charging pad 100 (coil) located on/in the electric vehicle 112 to the coil associated with the charging member 115, to thereby provide power from the electric vehicle 112 to a premises associated with a charging system as described herein. To the extent that power transfer from an electric vehicle to the charging station for use by a premises is more efficient when physically plugged together, a cable 203 and gun 205 (plug) as shown in FIG. 17 can also be provided in association with the ceiling mounted charging system as depicted in FIGS. 14-15. Preferably, the cable would be retractable, similar to coiled air pressure supply systems used in service stations so that the cable can remain out of the way and near the ceiling when not in use. It should also be reachable by users so that it can be grabbed and plug into the electric plug receptacle of the electric vehicle.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Furthermore, the functionalities including operations, steps, blocks, features, elements and instructions described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the embodiments may take the form of a computer program product embodied in one or more non-ephemeral computer readable media having computer readable and/or executable program code embodied thereon.

Although not required, the disclosed embodiments can be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, modules implemented as program modules may include, but are not limited to, routines, subroutines, software applications, programs, objects, components, data structures, etc., that can perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module), and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that can be a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in the underlying technology.

It will be understood that the appropriate circuits may be used in alternative embodiments depending on the circumstances in which the respective wireless power transfer system is expected to operate. This disclosure is not limited to any particular configuration of tuning reactive elements used in conjunction with an inductive power transfer circuit, and the parallel tuned, series tuned, and LCL tuned resonant circuits are provided herein by way of example only. Furthermore, the disclosure is not limited to any particular receiver-side means of generating a current in the receiver inductor and the voltage transformer, current transformer, and reversible rectifier techniques are discussed herein by way of example only.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer. An example of such a receiving coil is, for example, the charging coil 104.

An electric vehicle may be a remote system, an example of which can include, as part of its locomotion capabilities, electrical power derived from a chargeable energy storage device (e.g., one or more rechargeable electrochemical cells or other type of battery). As examples, some electric vehicles may be hybrid electric vehicles that include a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (for example, electronic devices such as personal computing devices and the like).

The various operations of methods, systems and devices described above may be performed by any suitable means capable of performing the operations, such as various hardware and/or software component(s), circuits, and/or module(s). Generally, any operations illustrated in the figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

The citation or identification of any reference herein, or any section of this application shall not be construed as an admission that such reference is available as prior art. The disclosure of each publication, patent, and/or other references herein are hereby incorporated by reference in their entirety in this application and shall be treated as if the entirety thereof forms a part of this application. Such references are provided for their disclosure of technologies as may be required to enable practice of the present invention, to provide written description for claim language, to make clear applicant's possession of the invention with respect to the various aggregates, combinations, permutations, and subcombinations of the respective disclosures or portions thereof (within a particular reference or across multiple references) in conjunction with the combinations, permutations, and subcombinations of various disclosure provided herein, to demonstrate the technological non-abstract nature of the inventions claimed, and for any other purpose.

Except as expressly indicated, the scope of the invention is inclusive, and therefore the disclosure of a technology or teaching within these incorporated materials is intended to encompass that technology or teaching as being an option of, or an addition to, other disclosure of the present invention. Likewise, the combination of incorporated teachings consistent with this disclosure is also encompassed. The citation of references is intended to be part of the disclosure of the invention, and not merely supplementary background information. While cited references may be prior art, the combinations thereof and with the material disclosed herein is not admitted as being prior art.

The incorporation by reference herein does not extend to teachings which may be inconsistent with the invention as expressly described herein as being essential. The incorporated references are rebuttable evidence of a proper interpretation of terms, phrases, and concepts employed herein by persons of ordinary skill in the art. No admission is made that any incorporated reference is analogous art to the issues presented to the inventor, and the selection, combination, and disclosure of these disparate teachings can be itself a part of the invention herein disclosed.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. An apparatus for charging electric vehicles, comprising:
    an x-y-z manipulable receptacle mounted to a structure located above more than one parking space, wherein the structure comprises a ceiling and wherein the x-y-z manipulable receptacle includes robotics mounted to the ceiling;
    a charge transmitting device coupled to the x-y-z manipulable receptable, wherein the charge transmitting device is automatically moveable and directable by the x-y-z manipulable receptacle toward a target area on a surface of at least one electric vehicle parked underneath the structure within one of more than one parking space served by the charge transmitting device, wherein at least one receiving coil is mounted thereon or therein within the surface of the at least one electric vehicle for electromagnetic charging of the at least one electric vehicle when the at least one receiving coil is engaged by the charge transmitting device when the at least one electric vehicle is located in at least one of the more than one parking space below the structure and the x-y-z manipulable receptacle, and wherein the charge transmitting device automatically disengages from the at least one receiving coil and retracts to the x-y-z manipulable receptacle for movement underneath the structure to charge another electric vehicle amona the electric vehicles parked under the structure after charging of the at least one electric vehicle among the electric vehicles;
    a controller operable to: manage data flow between the charge transmitting device and the at least one electric vehicle to control operations of the charge transmitting device, manage communications between the charge transmitting device and the at least one vehicle among the electric vehicles, manage the x-y-z manipulable receptacle, and locate and recognize the at least one vehicle among the electric vehicles parked under the structure; and
    at least one sensor operable to: assist the controller to locate, recognize, identify target areas, and direct the charge transmitting device to the at least one receiving coil by operation of the x-y-z manipulable receptacle.

2. The apparatus of claim 1, wherein the controller tracks charging of the electric vehicles based on at least one of: time and power transferred.

3. The apparatus of claim 1, further comprising:
    at least one receiving coil mounted on or in a surface of the at least one electric vehicle among the electric vehicles and operable to receive an electrical current from a charge transmitting device associated with the x-y-z manipulable receptacle mounted to a structure located above the at least one electric vehicle for charging of the at least one electric vehicle; and
    a battery management system associated with the at least one electric vehicle connected to the at least one receiving coil, wherein the at least one charging coil is operable to interact electromagnetically with the charge transmitting device for charging of the at least one electric vehicle.

4. The apparatus of claim 3, wherein the battery management system in the at least one electric vehicle among the electric vehicles is operable to communicate wirelessly with at least one of: the charge transmitting device and the controller.

5. The apparatus of claim 1, wherein the at least one sensor comprises a video camera, wherein the video camera and the controller guide the charge transmitting device to the at least one receiving coil for the charging of the at least one electric vehicle when the at least one electric vehicle is located below the x-y-z manipulable receptacle.

6. The apparatus of claim 5, wherein the video camera enables the charge transmitting device to identify the electric vehicles including the at least one vehicle.

7. The apparatus of claim 3 wherein the surface comprises a glass window, wherein the at least one receiving coil is integrated with the glass window at the surface.

8. The apparatus of claim 7 wherein the at least one receiving coil is in a form of a sticker attached to the glass window.

9. The apparatus of claim 1 wherein the at least one sensor comprises an electro-optical sensor.

10. The apparatus of claim 1 wherein the at least one electro-optical sensor in combination with machine learning is trainable to identify a location of the at least one receiving coil.

11. The apparatus of claim 1 wherein the structure further comprises a track or a rail connected to the ceiling and wherein the x-y-z manipulable receptacle is moveable along the track or the rail.

12. The apparatus of claim 1 wherein the at least one sensor is used to direct the charge transmitting device with misalignment detection and correction toward the at least one receiving coil.

* * * * *